United States Patent
Yin et al.

(10) Patent No.: US 11,943,061 B2
(45) Date of Patent: Mar. 26, 2024

(54) CHANNEL COLLISION HANDLING WITH URLLC, AND ACK FEEDBACK ON/OFF FOR HARQ-ACK OF URLLC PDSCH TRANSMISSIONS

(71) Applicant: SHARP KABUSHIKI KAISHA, Sakai (JP)

(72) Inventors: Zhanping Yin, Vancouver, WA (US); Tatsushi Aiba, Sakai (JP); Kazunari Yokomakura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 555 days.

(21) Appl. No.: 17/266,544

(22) PCT Filed: Aug. 7, 2019

(86) PCT No.: PCT/JP2019/031097
§ 371 (c)(1),
(2) Date: Feb. 5, 2021

(87) PCT Pub. No.: WO2020/032096
PCT Pub. Date: Feb. 13, 2020

(65) Prior Publication Data
US 2021/0314104 A1    Oct. 7, 2021

Related U.S. Application Data

(60) Provisional application No. 62/716,836, filed on Aug. 9, 2018.

(51) Int. Cl.
*H04L 1/1829* (2023.01)
*H04L 1/1812* (2023.01)
(Continued)

(52) U.S. Cl.
CPC .......... *H04L 1/1854* (2013.01); *H04L 1/1812* (2013.01); *H04L 1/1861* (2013.01); *H04W 72/21* (2023.01); *H04W 72/56* (2023.01)

(58) Field of Classification Search
CPC ... H04L 1/1854; H04L 1/1812; H04L 1/1861; H04W 72/21; H04W 72/56
See application file for complete search history.

(56) References Cited

U.S. PATENT DOCUMENTS

2019/0045546 A1* 2/2019 Li ..................... H04L 5/0073
2020/0053766 A1* 2/2020 Chien ................ H04W 72/23
2020/0077470 A1* 3/2020 Xiong ............... H04W 24/08

OTHER PUBLICATIONS

NTT DOCOMO, Inc., "UCI multiplexing for June drop URLLC", R1-1807064, 3GPP TSG RAN WG1 Meeting #93, Busan, Korea, May 21-25, 2018.

(Continued)

*Primary Examiner* — Chae S Lee
(74) *Attorney, Agent, or Firm* — ScienBiziP, P.C.

(57) ABSTRACT

A user equipment (UE) is described. The UE includes a higher layer processor configured to configure physical uplink control channel (PUCCH) resources for HARQ-ACK feedback of ultra-reliable low-latency communication (URLLC) physical downlink shared channel (PDSCH) transmissions. The higher layer processor is also configured to determine if there is a collision between a PUCCH for HARQ-ACK feedback of URLLC PDSCH transmissions and other uplink (UL) channels. The higher layer processor is further configured to determine if simultaneous UL transmissions is supported for URLLC transmissions and other UL channels. The UE also includes transmitting circuitry configured to transmit HARQ-ACK feedback for URLLC PDSCH transmission and other UL channels.

4 Claims, 19 Drawing Sheets

Method 1: URLLC PUCCH for HARQ-ACK punctures all other channels in the overlapping symbols

(51) Int. Cl.
*H04W 72/21* (2023.01)
*H04W 72/56* (2023.01)

(56) References Cited

OTHER PUBLICATIONS

VIVO, "Discussion on handling UL multiplexing of transmissions with different reliability requirements", R1-1803848, 3GPP TSG RAN WG1 Meeting #92bis, Sanya, China, Apr. 16-20, 2018.
ZTE et al., "Study of handling UL multiplexing of transmissions with different reliability requirements", R1-1801634, 3GPP TSG RAN WG1 Meeting #91, Athens, Greece, Feb. 26-Mar. 2, 2018.
LG Electronics, "Enhancements to UCI on PUSCH for Rei-13 CA", R1-151503, 3GPP TSG RAN WG1 Meeting #80bis, Belgrade, Serbia, Apr. 20-24, 2015.
ETRI, "UCIi multiplexing of different usage scenario", R1-1802145, 3GPP TSG RAN WG1 Meeting 92, Athens, Greece, Feb. 26-Mar. 2, 2018.
VIVO, "Discussion on eMBB and URLLC UCI multiplexing", R1-1806064, 3GPP TSG RAN WG1 Meeting #93, Busan, Korea, May 21-25, 2018.

\* cited by examiner

Method 2: different PUCCH resources are configured for NACK and ACK feedback with different parameters.

Method 1: a HARQ-ACK PUCCH resource is configured, but NACK and ACK are transmitted with different parameters, e.g. number of PRBs, TxD, transmit power etc.

CHANNEL COLLISION HANDLING WITH URLLC, AND ACK FEEDBACK ON/OFF FOR HARQ-ACK OF URLLC PDSCH TRANSMISSIONS

TECHNICAL FIELD

The present disclosure relates generally to communication systems. More specifically, the present disclosure relates to channel collision handling with ultra-reliable low-latency communication (URLLC), and acknowledgment (ACK) feedback ON/OFF for HARQ-ACK of URLLC physical downlink shared channel (PDSCH) transmissions.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE) is described. The UE includes a higher layer processor configured to configure physical uplink control channel (PUCCH) resources for HARQ-ACK feedback of ultra-reliable low-latency communication (URLLC) physical downlink shared channel (PDSCH) transmissions. The higher layer processor is also configured to determine if there is a collision between a PUCCH for HARQ-ACK feedback of URLLC PDSCH transmissions and other uplink (UL) channels. The higher layer processor is further configured to determine if simultaneous UL transmissions is supported for URLLC transmissions and other UL channels. The UE also includes transmitting circuitry configured to transmit HARQ-ACK feedback for URLLC PDSCH transmission and other UL channels.

In one example, an another UE is described. The UE includes a higher layer processor configured to configure PUCCH resources for HARQ-ACK feedback of URLLC PDSCH transmission. The higher layer processor is also configured to determine if ACK feedback is on or off for HARQ-ACK feedback of the URLLC PDSCH transmission. The UE also includes transmitting circuitry configured to transmit HARQ-ACK feedback for URLLC DL data based on the configured PUCCH resource and HARQ-ACK status.

DESCRIPTION OF EMBODIMENTS

Figure 1:
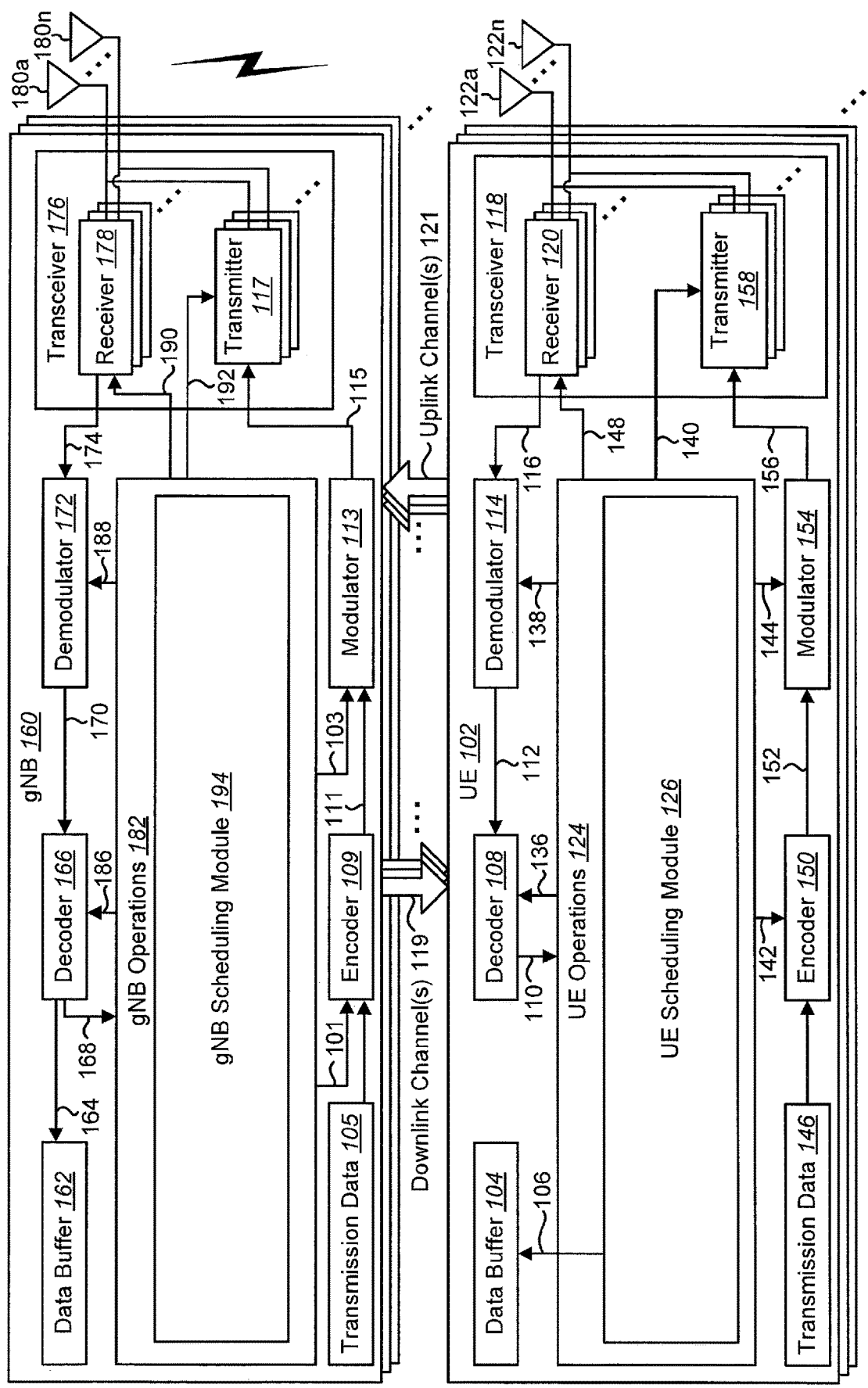
FIG. 1 is a block diagram illustrating one implementation of one or more base stations (gNBs) and one or more user equipments (UEs) in which channel collision handling with ultra-reliable low-latency communication (URLLC), and acknowledgment (ACK) feedback ON/OFF for HARQ-ACK of URLLC physical downlink shared channel (PDSCH) transmissions may be implemented.

A user equipment (UE) is described. The UE includes a higher layer processor configured to configure physical uplink control channel (PUCCH) resources for HARQ-ACK feedback of ultra-reliable low-latency communication (URLLC) physical downlink shared channel (PDSCH) transmissions. The higher layer processor is also configured to determine if there is a collision between a PUCCH for HARQ-ACK feedback of URLLC PDSCH transmissions and other uplink (UL) channels. The higher layer processor is further configured to determine if simultaneous UL transmissions is supported for URLLC transmissions and other UL channels. The UE also includes transmitting circuitry configured to transmit HARQ-ACK feedback for URLLC PDSCH transmission and other UL channels.

If there is a collision between a PUCCH for HARQ-ACK feedback of URLLC PDSCH transmissions and other UL channels, and if simultaneous UL transmissions is not supported for URLLC transmissions and other UL channels, the UE may transmit the PUCCH for HARQ-ACK feedback of URLLC PDSCH transmission and may drop the overlapping symbols on other UL channels.

If there is a collision between a PUCCH for HARQ-ACK feedback of URLLC PDSCH transmissions and other UL channels, and if simultaneous UL transmissions is supported for URLLC transmissions and other UL channels, the UE may transmit the PUCCH for HARQ-ACK feedback of URLLC PDSCH transmissions, and one of the other UL channels with highest priority.

Another UE is described. The UE includes a higher layer processor configured to configure PUCCH resources for HARQ-ACK feedback of URLLC PDSCH transmission. The higher layer processor is also configured to determine if ACK feedback is on or off for HARQ-ACK feedback of the URLLC PDSCH transmission. The UE also includes transmitting circuitry configured to transmit HARQ-ACK feedback for URLLC DL data based on the configured PUCCH resource and HARQ-ACK status.

The ACK feedback for a URLLC PDSCH transmission may be turned off. If the ACK feedback is turned off, and if the HARQ-ACK is corresponding to NACK, the UE may report a NACK using the configured PUCCH resource. If the ACK feedback is turned off, and if the HARQ-ACK is corresponding to ACK, the UE may not transmit a PUCCH corresponding to the PDSCH.

The ACK feedback for a URLLC PDSCH transmission may be turned on or off by higher layer signaling (e.g., RRC signaling). The ACK feedback for a URLLC PDSCH transmission may be turned on or off by indication of the fields in the scheduling DCI formats. The ACK feedback for a URLLC PDSCH transmission may be turned on or off by the MCS setting or the scrambling RNTI of the scheduling DCI.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station device.

In 5G NR, different services can be supported with different quality of service (QoS) requirements (e.g., reliability and delay tolerance). For example, eMBB may be targeted for high data rate, and URLLC is for ultra-reliability and low latency. To provide ultra-reliability for URLLC traffic, the PUCCH for UCI feedback may be enhanced to the same reliability level as the data for URLLC. Due to the ultra-low latency requirements, the PUCCH format 0 (i.e., short PUCCH with up to 2 bits of UCI) is more suitable for URLLC data HARQ-ACK feedback.

For HARQ-ACK feedback, different bit error rate (BER) requirements are applied for ACK to NACK error, and NACK to ACK error. Some differentiation methods may be introduced to provide better protection of NACK feedback than ACK feedback.

Furthermore, the PUCCH carrying HARQ-ACK for a URLLC PDSCH may have higher priority than other channels. Thus, a PUCCH carrying HARQ-ACK for a URLLC PDSCH transmission may puncture any other UL channels if collision occurs. If the ACK is always reported, excessive dropping of other UL channels may happen since the URLLC data has very low error probability of $10^{-5}$. Therefore, methods to avoid unnecessary UL channel dropping while providing the desirable reliability may be beneficial.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more base stations (gNBs) 160 and one or more user equipments (UEs) 102 in which channel collision handling with ultra-reliable low-latency communication (URLLC), and acknowledgment (ACK) feedback ON/OFF for HARQ-ACK of URLLC physical downlink shared channel (PDSCH) transmissions may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE scheduling module 126 may perform collision handling with URLLC, and ACK feedback ON/OFF for HARQ-ACK of URLLC PDSCH transmissions. For URLLC PDSCH transmissions, the HARQ-ACK feedback of a URLLC downlink (DL) data may have the same reliability requirements as the URLLC data transmission itself. The current NR PUCCH design is targeted for an acknowledgment (ACK) miss-detection probability of 1% and negative-acknowledgment (NACK) to ACK error probability of 0.1%. Therefore, some enhancements may be specified to increase the PUCCH reliability for HARQ-ACK feedback of URLLC traffic.

In NR, PUCCH format 0 is a short PUCCH with 1 or 2 symbols, and is designed for feedback of up to 2 UCI bits. To reduce the error probability of PUCCH format 0, several methods can be considered (e.g., configuring more than one physical resource block (PRB); time domain repetition; transmit diversity; different transmit power settings). These methods can be configured independently or jointly. A new PUCCH format may be defined to capture these enhancements.

Due to low latency requirements, two or more PUCCH resources may need to be configured in a single slot. The current time domain allocation for short PUCCH by configuring a single starting symbol in a slot will not be sufficient. Therefore, the PUCCH resource sets for URLLC traffic may be configured independently and separately from eMBB PUCCH resource sets. The PUCCH resource for URLLC may be configured with different parameters and/or with some different fields from that of eMBB resources.

For URLLC, a PDSCH transmission with a single codeword or TB is the most common case because only one codeword is supported for MIMO transmission with up to 4 layers. The error probability of a PUCCH carrying HARQ-ACK of a URLLC PDSCH should be targeted to at least the same error probability as the URLLC data (e.g., $10^{-5}$), or an order of magnitude lower (e.g., $10^{-6}$). Furthermore, the NACK to ACK error probability should be even lower than the ACK to NACK error probability. Thus, the NACK to ACK error probability may be $10^{-6}$, or even lower at $10^{-7}$.

To provide enough protection to NACK feedback, in one method, the PUCCH for both ACK and NACK feedback should be enhanced to achieve the lower error probability defined by NACK (e.g. $10^{-6}$ or $10^{-7}$). But this may result in excessive resource allocation for PUCCH. In another method, if different BER requirements are applied between ACK to NACK error and NACK to ACK error, some differentiation method may be introduced to provide better protection of NACK feedback than ACK feedback. For example, differentiation methods may include different PUCCH resources for ACK and NACK feedback, more PRB or time domain repetition for NACK feedback than ACK feedback, and/or higher transmit power for NACK feedback than ACK feedback.

Furthermore, the PUCCH carrying HARQ-ACK for a URLLC PDSCH may have higher priority than other channels. Thus, a PUCCH carrying HARQ-ACK for a URLLC PDSCH transmission may puncture any other UL channels if collision occurs. If the FACK is always reported, excessive dropping of other UL channels may happen since the URLLC data has very low error probability of $10^{-5}$. To avoid excessive dropping of other channels, the ACK feedback can be turned on/off. If the ACK feedback is turned off, only NACK is reported for URLLC DL data.

Aspects of PUCCH formats in NR are described herein. PUCCH may be used to report important uplink control information (UCI), which includes HARQ-ACK, SR, channel state information (CSI), etc. While NR release-15 is designed mainly for enhanced mobile broadband (eMBB), several physical uplink control channel (PUCCH) formats are specified for different number of bits, as given below.

The physical uplink control channel supports multiple formats as shown in Table 1. In case frequency hopping is configured for PUCCH format 1, 3, or 4, the number of symbols in the first hop is given by $$\lfloor N_{symb}^{PUCCH}/2 \rfloor$$

where $N_{symb}^{PUCCH}$ is the length of the PUCCH transmission in OFDM symbols.

TABLE 1

| PUCCH format | Length in OFDM symbols $N_{symb}^{PUCCH}$ | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

In 5G NR, different services can be supported with different quality of service (QoS) requirements (e.g., reliability and delay tolerance). For example, eMBB may be targeted for high data rate, and URLLC is for ultra-reliability and low latency.

The URLLC traffic may use the same numerology as eMBB service. The URLLC downlink transmission may also use a different SCS than eMBB DL transmission. For example, the URLLC traffic may use a higher numerology than eMBB service (i.e., the subcarrier spacing (SCS) of a URLLC transmission may be larger than that of an eMBB transmission). A larger SCS configuration for URLLC reduces the length of an OFDM symbol, and thus the latency of a transmission and its HARQ-ACK feedback.

In some approaches, the URLLC DL transmission and UL transmission may be configured with the same numerology. In other approaches, the URLLC DL transmission and UL transmission may be configured with the different numerologies. For HARQ-ACK feedback for of DL URLLC transmission, a URLLC short PUCCH may use a different numerology than other short PUCCH. For example, the URLLC PUCCH may have shorter symbol lengths than other short PUCCH or PUSCH transmissions. In this disclosure, URLLC DL data transmission and the corresponding HARQ-ACK feedback on PUCCH is described.

To provide ultra-reliability for URLLC traffic, a different CQI and MCS table maybe configured for URLLC with $10^{-5}$ error probability. At the same time, the PUCCH for HARQ-ACK feedback of URLLC data may be enhanced at least to the same reliability level as the data for URLLC.

For URLLC traffic, several aspects may be considered for PUCCH design and PUCCH transmissions. URLLC traffic requires ultra-reliability and low latency. The HARQ-ACK for URLLC packet may be supported to provide the required reliability. Furthermore, the HARQ-ACK feedback may be reported immediately after a URLLC transmission. Moreover, the HARQ-ACK feedback may have the same reliability as the URLLC data transmission (i.e., the current PUCCH channel BER requirements of 1% or 0.1% may not satisfy the URLLC requirements). The HARQ-ACK BER requirement may be the same or better than the URLLC data channel (i.e., at least $10^{-5}$ or $10^{-6}$).

The URLLC traffic may share the HARQ-ACK processes with eMBB. However, the number of HARQ-ACK processes for URLLC can be limited (e.g., only 1 or 2 HARQ-ACK processes for URLLC traffic). Thus, the PUCCH format for URLLC DL transmission may also provide ultra-reliability and low latency after a URLLC transmission. Only short PUCCH may be used for URLLC HARQ-ACK feedback. The position of short PUCCH can be determined dynamically based on URLLC DL data transmission (e.g., immediately after a URLLC DL transmission with a gap satisfying the processing time requirements).

Due to the ultra-low latency requirements, the PUCCH format 0 (i.e., the short PUCCH with up to 2 bits of UCI) is more suitable for URLLC data HARQ-ACK feedback. The NR PUCCH format 0 occupies a single physical resource block (PRB) and uses sequences to indicate up to 2 bits of payload. To reduce the error probability of PUCCH format 0, several methods may be considered (e.g., configuring more than one PRBs, time domain repetition, transmit diversity, different transmit power settings).

These methods may be configured independently or jointly. A new PUCCH format may be defined to capture these enhancements. The new PUCCH format may be named as PUCCH format 5, PUCCH format 0_1, advanced PUCCH format 0 (PUCCH format 0a), enhanced PUCCH format 0 (PUCCH Format 0e), ultra-reliable PUCCH format 0 (PUCCH format 0_r, or format 0_u), etc.

URLLC PUCCH resource allocation and configuration is described herein. In NR, multiple PUCCH resource sets may be configured for different payload sizes. In each PUCCH resource set, up to 16 PUCCH resources can be configured. If the number of resources is more than 4, subsets are formed. In NR, for a PUCCH reporting, the PUCCH resource set may first be determined based on the UCI payload size. The ARI field may indicate the PUCCH resource subset in a PUCCH resource set. If there are more than 1 PUCCH resources in each subset, the PUCCH resource for UCI reporting may be determined implicitly based on CCE index of the scheduling DCI.

For URLLC, the short PUCCH may be useful because of the low latency requirements. At least one PUCCH resource set for up to 2 bits of UCI may be configured. Since URLLC has different reliability and delay requirements from eMBB. The HARQ-ACK feedback PUCCH resources for URLLC may be configured separately from eMBB. The PUCCH resources for URLLC may be configured with different parameters than normal PUCCH resources for eMBB.

Figure 2:
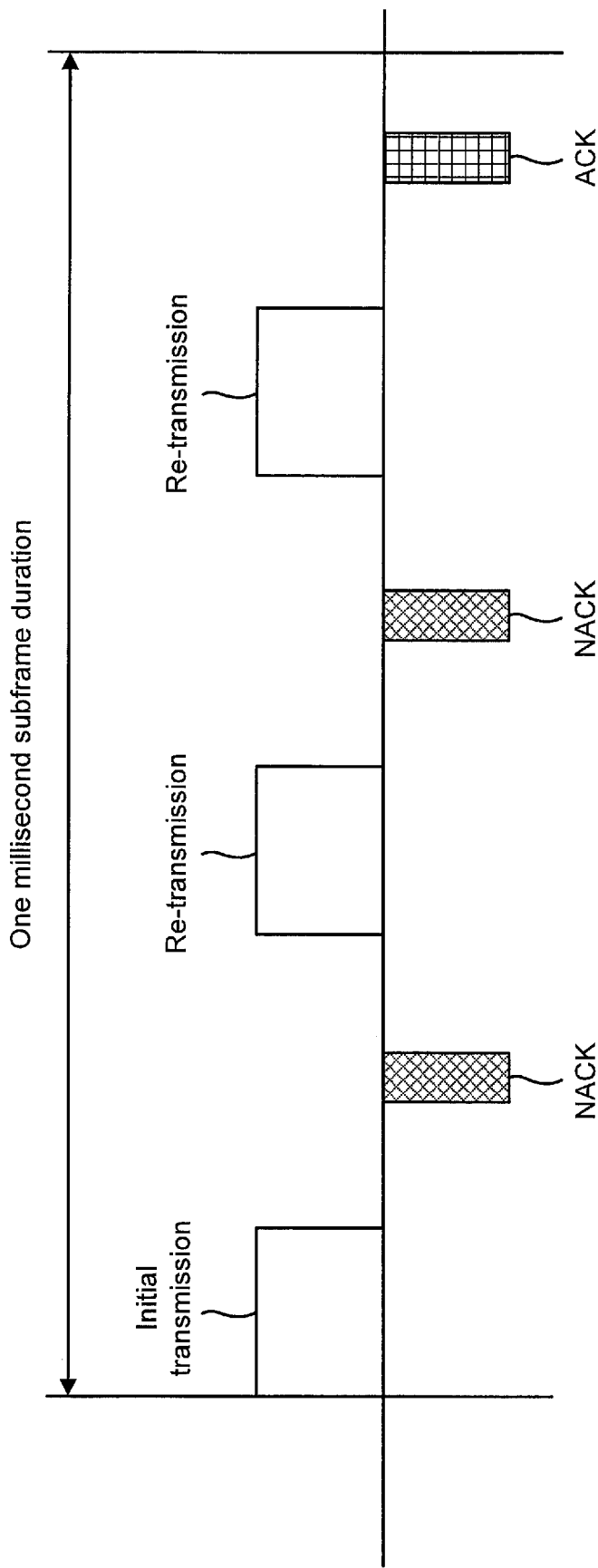
FIG. 2 is an example illustrating sub-slot ultra-reliable low-latency communication (URLLC) physical downlink shared channel (PDSCH) and HARQ-ACK feedback within 1 subframe.

To provide desired reliability for DL URLLC transmission, PUCCH resources may be allocated to allow PDSCH retransmissions. Due to high reliability and low latency requirements, to support re-transmission of URLLC PDSCH, one or more HARQ-ACK feedback may be reported within a subframe, and more than 2 PUCCH resources may be configured in a subframe or a slot, as shown in FIG. 2.

The current time domain allocation for a short PUCCH by configuring a starting symbol and a duration may not be sufficient. Some enhancements for time domain PUCCH resource allocation and configuration for enhanced short PUCCH may be implemented (e.g., a PUCCH resource subset includes multiple PUCCH resources with different starting symbols in a slot; a single PUCCH resource may be configured with multiple starting symbol positions in a slot; a PUCCH resource may be configured with a PUCCH format and a periodicity, etc.).

URLLC ACK and NACK feedback differentiation is described herein. The BER requirement of HARQ-ACK feedback on PUCCH for a URLLC PDSCH transmission should be the same as or better than the URLLC data channel (e.g., at least $10^{-5}$ or $10^{-6}$). Moreover, the NACK to ACK error probability should be much lower than the ACK to NACK error probability. If an ACK is detected as a NACK, the PDSCH will be re-transmitted and cause unnecessary waste of resource. On the other hand, if a NACK is detected as an ACK, the gNB 160 may assume it is correctly received, and the packet data will be dropped. This may cause much more overhead of re-transmission. If a segment is dropped by mistake, all segments may have to be re-transmitted by higher layer packet dropping and re-transmission. Thus, if the ACK to NACK error probability is $10^{-5}$, the NACK to ACK error probability should be $10^{-6}$; if the ACK to NACK error probability is $10^{-6}$, the NACK to ACK error probability should be $10^{-7}$.

To provide enough protection to NACK feedback, in one method, the PUCCH for both ACK and NACK feedback should be enhanced to achieve the lower error probability required for NACK (e.g., $10^{-6}$ or $10^{-7}$). But this may result in excessive resource allocation for PUCCH.

Figure 3:
FIG. 3 illustrates ACK and NACK feedback differentiation methods.
Figure 3:
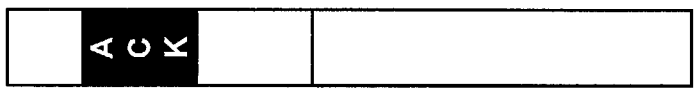
Figure 3:

In another method, if different BER requirements are applied between ACK to NACK error and NACK to ACK error, some differentiation methods may be introduced to provide better protection on NACK feedback than ACK feedback. Several methods are described herein. FIG. 3 illustrates two ACK and NACK feedback differentiation methods described herein.

In a first method (Method 1), a PUCCH resource may be configured to report HARQ-ACK (either ACK or NACK) for URLLC PDSCH transmission, but different actual transmission modes and configurations may be used for reporting of ACK and NACK.

A PUCCH resource for URLLC may be configured with multiple PRBs, time domain repetition, transmit diversity and/or enhanced power control. The PUCCH resource may be configured based on the higher reliability requirement between ACK and NACK (e.g., based on NACK feedback BER requirements). If the feedback is a NACK, the configured parameters may be used. If the feedback is an ACK, different PUCCH parameters may be used to reduce the PUCCH resource overhead. Namely, based on a detection of the PDSCH transmission, if the UE 102 feedbacks HARQ-ACK (either ACK or NACK), the UE 102 may use the PUCCH resource based on the configured parameters to feedback the HARQ-ACK. And, if the HARQ-ACK is corresponding to NACK, the UE 102 may use a whole of the PUCCH resource configured by the parameters. Also, if the HARQ-ACK is corresponding to ACK, the UE 102 may use a part of the PUCCH resource configured by the parameters.

In an example, if multiple PRBs are configured, the NACK should be reported using all configured PRBs, and ACK may be reported with fewer PRBs.

In another example, if time domain repetition is configured, the NACK may be reported using the configured number of time domain repetitions (e.g., the number of slot(s) and/or symbol(s)), and the ACK may be reported with fewer numbers of time domain repetitions. As a special case, if a two-symbol PUCCH is configured, the NACK should be reported using two-symbol PUCCH and the ACK may be reported with a one-symbol PUCCH by using only the first symbol of the two-symbol PUCCH resource.

In another example, if TxD is configured, NACK should be transmitted with two antenna ports using two PUCCH resources, ACK may be reported with a single antenna port on a single PUCCH resource.

In yet another example, different transmit power may be applied for the PUCCH transmission for ACK and NACK. The transmit power for a NACK feedback should be higher than the transmission of an ACK feedback. The difference between the transmit power or the delta value may be pre-defined or RRC configured to a UE 102.

It should be noted that the different parameters may be configured independently or jointly for the PUCCH resources of ACK and NACK feedback. For example, the gNB 160 may transmit, by using a higher layer signal(s) (e.g., an RRC message), the parameter(s) used for configuring the PUCCH resource(s) of ACK and NACK. Also, the gNB 160 may transmit, by using DCI included in the DCI format(s) used for scheduling of the PDSCH transmission, the parameter(s) used for indicating the PUCCH resource(s) of ACK and NACK. Also, the PDCCH scheduling the PDSCH transmission (e.g., a control channel element(s) of the PDCCH) may be used for indicating the PUCCH resource(s) of ACK and NACK. Here, as described above, the gNB 160 may configure the parameter(s) only for the short PUCCH format(s) (e.g., the PUCCH format 0 and/or the PUCCH format 1).

Here, as described above, the parameter(s) may include, at least, a parameter(s) used for configuring a starting PRB index(es) and/or the number of PRB(s) (i.e., a frequency domain configuration). Also, the parameter(s) may include, at least, a parameter(s) used for configuring the number of repetition(s) (i.e., a time domain configuration). Also, parameter(s) may include, at least, a parameter(s) used for configuring the number of antenna port(s) (i.e., a spatial domain configuration, whether two antenna ports are used or not). Also, the parameter(s) may include, at least, a parameter(s) used for configuring transmit power. Also, as described below, the parameter(s) may include, at least, a parameter(s) used for configuring a value of cyclic shift.

As described above, the UE 102 may use the PUCCH resource (i.e., one PUCCH resource(s)) based on the parameter(s) to transmit HARQ-ACK (either ACK or NACK). And, the UE 102 may determine, based on whether the HARQ-ACK is corresponding to ACK or NACK, the amount of resources (e.g., the number of resource elements (RE(s)) in frequency and/or time domain) used for HARQ-ACK feedback. For example, for ACK feedback, the UE 102 may use less amounts of resources than that of resources used for NACK feedback. Here, how to determine the amount of resources (e.g., the amount of resources for ACK feedback) may be determined, in advance, by the specification, etc., (e.g., by using an equation). Also, the gNB 160 may configure, by using the higher layer signal(s), a parameter(s) (e.g., an offset value(s)) used for configuring the amount of resources (e.g., the amount of resource for ACK feedback). The UE 102 may determine, based on the parameter(s) (e.g., the offset value(s)), the amount of resources used for HARQ-ACK feedback (e.g., the amount of resources for ACK feedback) on the PUCCH resource.

In a second method (Method 2), separate PUCCH resources may be configured for ACK feedback and NACK feedback. For example, the gNB 160 may configure PUCCH resources only used for ACK feedback, and may configure PUCCH resources only used for NACK feedback. And, based on a detection of PDSCH transmission, if HARQ-ACK is corresponding to ACK, the UE 102 may use the PUCCH resource only used for ACK feedback. Also, based on a detection of PDSCH transmission, if HARQ-ACK is corresponding to NACK, the UE 102 may use the PUCCH resource only used for NACK feedback.

In this method, different PUCCH resources and different parameters are configured for ACK feedback and NACK feedback. The PUCCH resource for a NACK feedback may be configured with parameters that provide better BER performance than that of the PUCCH resource for an ACK feedback.

In an example, the PUCCH resources for ACK and NACK feedback may have different starting PRB indexes and a different number of PRBs. The number of PRBs (e.g., supported number of PRBs) configured for NACK feedback may be higher than that of ACK feedback.

In another example, the PUCCH resources for ACK and NACK feedback may have a different number of symbols (e.g., supported number of symbols) or number of time domain repetitions (e.g., supported number of time domain repetitions). For example, 1 symbol PUCCH for ACK feedback and 2-symbol PUCCH for NACK feedback.

In another example, the PUCCH for NACK feedback may be configured with TxD, and the PUCCH for ACK may not be configured with TxD. Namely, only for NACK feedback, two antenna ports transmission may be supported. For example, if the UE 102 is configured with two antenna ports transmission for PUCCH format 0, for HARQ-ACK transmission using PUCCH format 0, the UE 102 may use two antenna ports (with two PUCCH resources) only for NACK feedback, and use single antenna port (with single PUCCH resource) for ACK feedback.

In yet another example, the transmit power for a NACK feedback may be configured with a higher value than that of a PUCCH for ACK feedback. The difference between the transmit power or the delta value may be pre-defined or RRC configured to a UE 102.

It should be noted that the different parameters may be configured independently or jointly for PUCCH resources of ACK and NACK feedback. Here, as with the method 1, the gNB 160 may configure the different parameters for PUCCH resources. Also, the different parameter(s) may include, at least, the parameter(s) described in the method 1.

In this second method, besides the PUCCH transmission and detection, another level of ACK/NACK feedback may be provided by on/off keying of different PUCCH resources. NACK may be reported only on a configured NACK resource (e.g., the PUCCH resource only used for NACK feedback) and ACK may be reported only on a configured ACK resource (e.g., the PUCCH resource only used for ACK feedback).

With PUCCH Format 0, a resource is defined by a sequence and a cyclic shift in each configured RB. Thus, if one PUCCH resource is configured for a single bit of ACK or NACK feedback (e.g., similar with the method 1), two cyclic shifts with distance of 6 are reserved, and the resource is configured based on the lowest BER requirements between ACK and NACK. If two different PUCCH resources are configured for ACK and NACK feedback (e.g., similar with the method 2), each PUCCH resource only reserves one cyclic shift of the sequence. Thus, the PUCCH resource overhead is not increased. In fact, since a PUCCH resource for an ACK feedback has less redundancy or overhead than a PUCCH resource for a NACK feedback, the overall resource overhead for separate PUCCH resources for ACK and NACK feedback in method 2 is lower than that of a single PUCCH resource for both ACK and NACK feedback in method 1.

Moreover, due to ultra-low error probability, the ACK feedback may be turned off, as described in detail below. In this case, the UE 102 may be configured with only PUCCH resources for NACK feedback.

Figure 4:
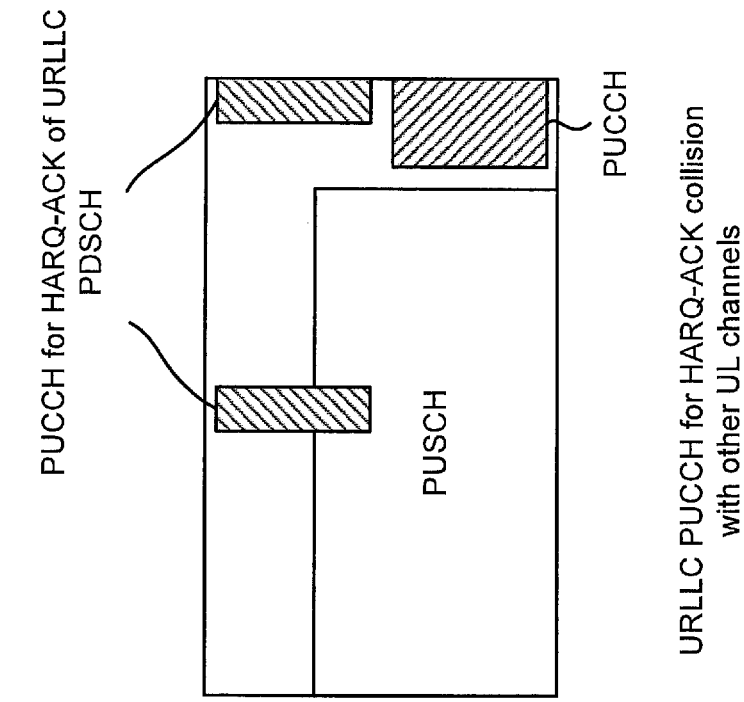
FIG. 4 illustrates an example of a collision of URLLC PUCCH for HARQ-ACK with other UL channels.

URLLC PUCCH transmission and collision handling with other UL channels is also described herein. URLLC traffic requires ultra-reliability and low latency. An URLLC UL data transmission may collide with a PUCCH or a PUSCH transmission of the same UE 102 (e.g., on the same symbol). An example of a collision of URLLC PUCCH for HARQ-ACK with other UL channels is illustrated in FIG. 4.

As a general rule, the URLLC traffic should have higher priority than any other UL transmissions. Furthermore, the HARQ-ACK feedback of a DL URLLC PDSCH transmission should have higher priority than an UL URLLC data. Thus, the PUCCH feedback for a URLLC PDSCH transmission should have the highest priority among all channels or UL transmissions.

In NR release-15, simultaneous UL channel transmission on the same BWP or CC is not supported. In case of full overlapping or partial overlapping between PUCCHs and/or PUSCHs, some UCI multiplexing rules may be defined with some processing time restrictions.

At least for PUCCH carrying HARQ-ACK feedback of URLLC PDSCH transmission, UCI multiplexing with other PUCCH for normal PDSCH transmission is difficult for several reasons. Multiplex HARQ-ACK of URLLC traffic on a normal PUCCH cannot satisfy the ultra-low BER requirement. And, there are not enough resources for the PUCCH to increase the reliability to the desired level. Multiplex on a HARQ-ACK PUCCH for URLLC will increase the payload, and reduces the BER performance of HARQ-ACK feedback for URLLC traffic. The starting position and duration of the normal PUCCH may be very different from a PUCCH for URLLC feedback. Additionally, the normal PUCCH and URLLC PUCCH may not be aligned.

At least for PUCCH carrying HARQ-ACK feedback of URLLC PDSCH transmission, HARQ-ACK multiplexing on a normal PUSCH transmission may also be difficult. The RE mapping for URLLC HARQ-ACK should be different from normal HARQ-ACK. A much higher beta offset value may be used. The UE 102 may not have enough processing time to handle the PUSCH data puncturing or rate matching. The HARQ-ACK of a URLLC may come at any symbol, if the HARQ-ACK is multiplexed after a DMRS symbol, the timing requirement may be violated for URLLC traffic.

Therefore, the PUCCH carrying HARQ-ACK for URLLC PDSCH may always be transmitted, and the other UL channels may be de-prioritized or dropped.

Figure 5:
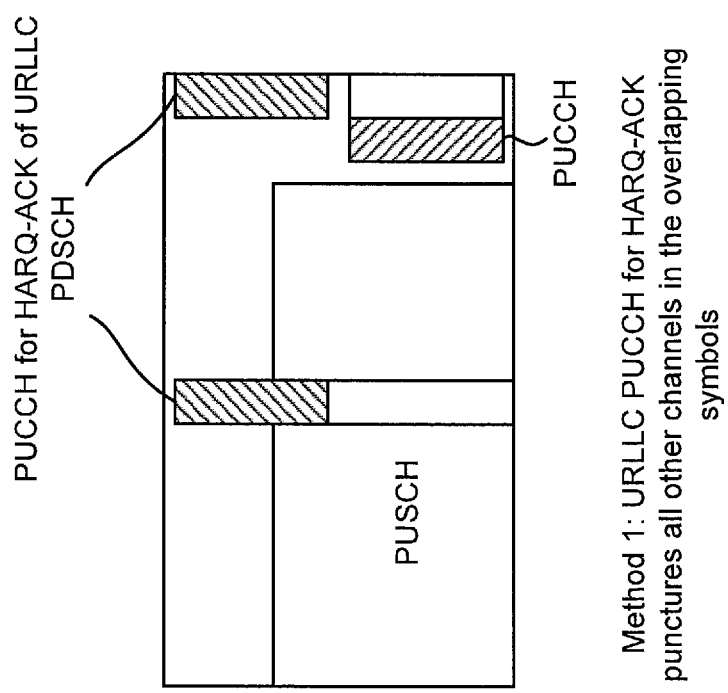
FIG. 5 illustrates an example where URLLC PUCCH for HARQ-ACK punctures all other channels in the overlapping symbols.

In a first method (Method 1), PUCCH carrying HARQ-ACK of URLLC PDSCH may be transmitted and any other UL channel(s) in the overlapping symbol is dropped. An example where URLLC PUCCH for HARQ-ACK punctures all other channels in the overlapping symbols is illustrated in FIG. 5.

This is a simple solution and can be applicable in all cases regardless of the type of overlapping channels. In case the URLLC traffic is configured with a higher SCS than the eMBB traffic, the whole symbol in the overlapping channel should be dropped even if the PUCCH for URLLC occupies part of the symbol duration of the overlapping channel. For example, a first SCS may be configured for a first PDCCH and/or a first PDSCH. The first PDCCH may be used for scheduling of the PDSCH. Also, a second SCS may be configured for a second PDCCH and/or a second PDSCH. The second PDCCH may be used for scheduling of the second PDSCH. Here, the first SCS and the second SCS may be configured for the same BWP (e.g., the same DL BWP) and/or the same timing (e.g., the same slot(s) and/or symbol(s)).

In a case that the first SCS (e.g., 60 kHz SCS) is configured with a higher SCS than the second SCS (e.g., 15 kHz), if the UE 102 detects the first PDCCH and/or the first PDSCH, the UE 102 may perform on the PUCCH, HARQ-ACK transmission corresponding to the first PDSCH (e.g., even if the PUCCH symbol(s) for the first PDSCH and the PUCCH symbols(s) for the second PDSCH are overlapped). In this case, the UE 102 may drop HARQ-ACK transmission for the second PDSCH (e.g., drop the whole symbol of the PUCCH for HARQ-ACK transmission for the second PDSCH).

Figure 6:
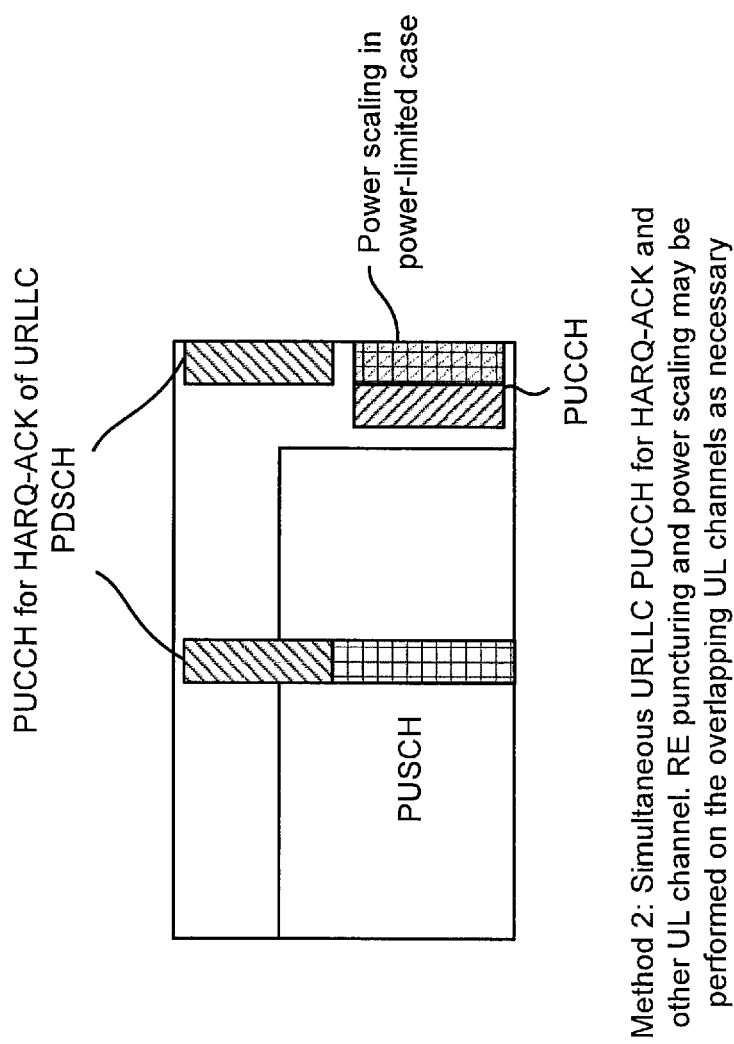
FIG. 6 illustrates an example of simultaneous URLLC PUCCH for HARQ-ACK and other UL channels.

In a second method (Method 2), simultaneous transmission of PUCCH carrying HARQ-ACK for URLLC PDSCH and other PUCCH or PUSCH transmission may occur, with power scaling on other channels in a power limited case. An example of simultaneous URLLC PUCCH for HARQ-ACK and other UL channels is illustrated in FIG. 6.

To support URLLC traffic without dropping too many UL channels, simultaneous UL channel transmission may be supported in Release-16 and later. If supported, the PUCCH for URLLC traffic may be transmitted simultaneously with another PUCCH or PUSCH channel.

If simultaneous transmission of PUCCH for URLLC and another UL channel (PUCCH or PUSCH) is supported on the same symbol, and if there are overlapping REs between the PUCCH for URLLC PDSCH feedback and the other UL channel, the overlapping REs of the other UL channel is punctured by the PUCCH for URLLC PDSCH feedback. Furthermore, UL transmit power should be allocated to the PUCCH for URLLC traffic first. The remaining power can be allocated to the remaining REs of the other UL channel in the same UL symbol. In a power limited case, power scaling should be performed on the remaining REs of the other UL channel in the same UL symbol to satisfy the Pcmax limit on the given BWP or serving cell.

Simultaneous UL channel transmission may be limited to URLLC transmissions (e.g., simultaneous UL transmission may be supported only if one of the UL channel is for URLLC or sub-slot transmission). In this case, the simultaneous UL channel transmission support may be defined as a UE feature under URLLC, and may be configured to a UE 102 from a gNB 160 by RRC signaling. If configured, the following simultaneous transmission may be supported: A PUCCH for HARQ-ACK of URLLC PDSCH can be transmitted simultaneously with other UL channels; a URLLC PUSCH (e.g., a sub-slot PUSCH with new MCS table of $10^{-5}$ target BLER) can be simultaneously transmitted with other UL channels; and/or a PUCCH for HARQ-ACK of URLLC PDSCH may be simultaneously transmitted with a URLLC PUSCH transmission by either grant-based or grant-free scheduling.

Simultaneous UL channel transmission may be extended to all traffic types (e.g., both PUCCH and PUSCH are for eMBB transmissions). In this case, the simultaneous UL channel transmission support may be defined as a separate UE feature, and may be configured to a UE 102 from a gNB 160 by RRC signaling.

To simplify the process, simultaneous UL transmission may be limited to 2 UL channels. An order of priority may be defined for UL channels from the highest priority to lowest priority (e.g., PUCCH for HARQ-ACK of URLLC PDSCH transmission>PUCCH for SR of URLLC>PUSCH for URLLC>PUCCH for URLLC CSI reporting>PUCCH for HARQ-ACK feedback of eMBB PDSCH>PUCCH for SR of eMBB>PUCCH for CSI feedback of eMBB PDSCH>PUSCH for eMBB).

URLLC PUCCH ON/OFF for ACK feedback is also described herein. Due to ultra-reliability of URLLC data transmission, the probability than a NACK is reported is very low at $10^{-5}$. In another words, 99.999% of HARQ-ACK feedback for URLLC PDSCH will be ACK. If the PUCCH for HARQ-ACK feedback is always reported for a URLLC PDSCH transmission, 99.999% of time ACK is reported. Whenever there is a collision between the PUCCH for URLLC traffic and another UL channel, the other UL channel is dropped if method 1 (e.g., URLLC PUCCH punctures any other UL channel) above is applied; or the performance is degraded if method 2 (e.g., simultaneous transmission of PUCCH for URLLC and other channel) above is applied.

To avoid excessive dropping of other UL channels, the ACK feedback can be turned on or off. If the ACK feedback is turned off, only NACK is reported on the PUCCH (e.g., the PUCCH for URLLC DL data). This significantly reduces the number of PUCCH transmissions because the NACK probability is only $10^{-5}$. Therefore, the other UL channel transmissions are not impacted in most cases.

There is one potential issue for the DL miss-detection. For normal PDSCH transmission, the PDCCH miss-detection probability is 1%, the block error rate (BLER) target for a PDSCH decoding is 10%, and the HARQ-ACK feedback error probability is 1% to 0.1%. In a normal HARQ-ACK procedure, for a single PDSCH transmission, if a UE 102 does not detect a scheduling DCI correctly for the given PDSCH transmission, no HARQ-ACK is reported and no PUCCH is transmitted. The gNB 160 treats the missing of a corresponding PUCCH feedback as a DTX, and the gNB 160 then re-transmits the PDSCH.

If the ACK feedback is turned off (e.g., for URLLC PDSCH transmission), the gNB 160 cannot differentiate a DTX from an ACK. In case of a DTX occurs, the gNB 160 may think the PDSCH is correctly received because no NACK is reported. However, if the PDCCH miss-detection probability is lower than the data error probability, the PDCCH miss-detection error is acceptable because it already satisfies the data performance criteria. For example, if the expected URLLC data error probability is $10^{-5}$, and the PDCCH error probability is $10^{-5}$ or $10^{-6}$, the DTX error is acceptable even if the ACK feedback is turned off.

It should be noted that the error probability for a PDSCH already considers necessary PDSCH re-transmissions, and the initial PDSCH transmission probability may be much higher than the expected URLLC data error probability. For example, the initial PDSCH transmission error probability may be $10^{-3}$, after a retransmission, the PDSCH error probability may be reduced to $10^{-5}$ or $10^{-6}$.

In conclusion, if the PDCCH for URLLC scheduling is enhanced to have the same or much lower error probability than the target URLLC data error probability, the ACK feedback (e.g., for URLLC PDSCH transmission) may be turned off to avoid excessive dropping of other UL channels.

The ACK feedback on/off can be regarded as a special handling of ACK and NACK differentiation. In this extreme case, the ACK does not need to be reported, and only NACK is reported. If the ACK feedback is turned off, the UE 102 can be configured with PUCCH resource for only NACK reporting (e.g., for sequence base format 0 feedback) and only one cyclic shift of a sequence needs to be reserved for the HARQ-ACK feedback. No PUCCH reporting will be treated as an ACK, and the detection of the PUCCH transmission is a NACK. Basically, the NACK feedback is confirmed with ON/OFF keying of PUCCH transmission. The combination of on/off keying and NACK detection on PUCCH will provide higher reliability for the HARQ-ACK feedback.

Several methods are described for signaling of ACK feedback on/off. In one method, the on/off of ACK feedback (e.g., for URLLC DL transmission) may be configured by higher layer signaling. If the ACK feedback (e.g., for URLLC DL transmission) is turned off, the PUCCH resources for HARQ-ACK feedback are configured for only NACK feedback. Namely, the gNB 160 may transmit, by using the higher layer signal(s), a parameter(s) used for indicating whether ACK feedback is performed or not (i.e., ACK feedback is turned on or off). For example, the gNB 160 may configure, per PUCCH format, the parameter(s) used for indicating whether ACK feedback is performed or not. Also, the gNB 160 may configure, per BWP (e.g., UL BWP), the parameter(s) used for indicating whether ACK feedback is performed or not. Also, the gNB 160 may configure, per serving cell, the parameter(s) used for indicating whether ACK feedback is performed or not. Also, the gNB 160 may configure, per PUCCH sell group (e.g., a primary PUCCH group and a secondary PUCCH group), the parameter(s) used for indicating whether ACK feedback is performed or not. And, the UE 102 may determine, based on the parameter(s), whether ACK feedback is performed or not.

For example, in a case that ACK feedback is configured with "turned on" by the higher layer signal(s), for eMBB PDSCH transmission (i.e., PDSCH transmission), the UE 102 may perform HARQ-ACK (i.e., either ACK or NACK) feedback. The gNB 160 may configure first PUCCH resources used for HARQ-ACK (i.e., either ACK or NACK) feedback.

In a case that ACK feedback is configured with "turned on" by the higher layer signal(s), for URLLC PDSCH transmission (i.e., PDSCH transmission), the UE 102 may perform HARQ-ACK (i.e., either ACK or NACK) feedback. The gNB 160 may configure first PUCCH resources used for HARQ-ACK (i.e., either ACK or NACK) feedback.

In a case that ACK feedback is configured with "turned off" by the higher layer signal(s), for eMBB PDSCH transmission, the UE 102 may perform HARQ-ACK (i.e., either ACK or NACK) feedback. The gNB 160 may configure first PUCCH resources used for HARQ-ACK (i.e., either ACK or NACK) feedback.

In a case that ACK feedback is configured with "turned off" by the higher layer signal(s), for URLLC PDSCH transmission, the UE 102 may perform only NACK feedback. The gNB 160 may configure second PUCCH resources used only for NACK feedback. Namely, the UE 102 may apply for the on/off of ACK feedback only for URLLC PDSCH transmission.

Alternatively, in a case that ACK feedback is configured with "turned off" by the higher layer signal(s), for eMBB and URLLC PDSCH transmission (i.e., PDSCH transmission), the UE 102 may perform only NACK feedback. The gNB 160 may configure second PUCCH resources used only for NACK feedback. Namely, the UE 102 may apply for the on/off of ACK feedback or eMBB and URLLC PDSCH transmission.

Here, the first PUCCH resources may correspond to the PUCCH resource described in the method 1 and/or 2.

In another method, the on/off of ACK feedback for URLLC DL transmission may be signaled in a DCI format. Namely, information used for indicating whether ACK feedback is perform or not (i.e., ACK feedback is turned on or off) may be included in the DCI format (e.g., the DCI format used for scheduling of the PDSCH (i.e., the PDSCH transmission)). For example, in a case that "turned on" of ACK feedback is indicated by DCI (e.g., the DCI format), the UE 102 may perform HARQ-ACK (i.e., either ACK or NACK) feedback. The gNB 160 may configure first PUCCH resources used for HARQ-ACK (i.e., either ACK or NACK) feedback.

In a case that "turned off" of ACK feedback is indicated by DCI (e.g., the DCI format), the UE 102 may perform only NACK feedback. The gNB 160 may configure second PUCCH resources used only for NACK feedback.

In one case, the URLLC PDSCH HARQ-ACK feedback timing may be indicated in DCI by the PDSCH-to-HARQ-timing indicator field. If ACK on/off is supported, the entries for the PDSCH-to-HARQ-timing indicator field maybe divided into 2 groups, one group indicates the timing with ACK feedback ON, another group indicates timing with ACK feedback OFF. Therefore, only 4 different timings can be indicated by the 8 entries of the PDSCH-to-HARQ-timing indicator field.

In a similar approach, the current 3-bit PDSCH-to-HARQ-timing indicator field may be divided into two parts. Two bits are used to indicate the HARQ-ACK timing by an index of a RRC configured timing table with 4 entries only. The other bit is used to explicitly indicate whether ACK should be reported or not. If the bit is "0", no ACK is reported and only NACK is reported; if the bit is "1", both ACK and NACK should be reported.

In yet another approach, a new field with length of one bit may be added to the DCI to explicit indicate whether ACK should be reported or not. If the bit is "0", no ACK is reported and only NACK is reported; if the bit is "1", both ACK and NACK should be reported.

In another case, the URLLC PDSCH HARQ-ACK feedback timing may be determined based on a pre-defined or configured processing time table, and the PDSCH-to-HARQ-timing-indicator field may be ignored or removed from the PDSCH scheduling DCI format for URLLC data. In this case, a new field with length of one bit may be added to the DCI to explicit indicate whether ACK should be reported or not. If the bit is "0", no ACK is reported and only NACK is reported; if the bit is "1", both ACK and NACK should be reported.

In yet another method, different DCI formats may be used to implicitly determine whether ACK feedback should be reported or not (i.e., turned on or off). For example, a compact DCI without HARQ-ACK timing information implies ACK feedback is turned OFF. Note in this case, a default HARQ-ACK timing is applied for a NACK feedback of the scheduled URLLC PDSCH transmission. A regular DCI or a long DCI with timing indication implies feedback for both ACK and NACK is required. For example, in a case that the regular DCI or the long DCI (e.g., a first DCI format) used for scheduling of the PDSCH is detected, the UE 102 may perform HARQ-ACK (i.e., either ACK or NACK) feedback. The gNB 160 may configure first PUCCH resources used for HARQ-ACK (i.e., either ACK or NACK) feedback.

In a case that the compact DCI (e.g., a second DCI format) used for scheduling of the PDSCH is detected, the UE 102 may perform only NACK feedback. The gNB 160 may configure second PUCCH resources used only for NACK feedback.

In another method, the ACK feedback ON/OFF may be determined based on the MCS setting of a PDSCH transmission. For PDSCH and PUSCH with CP-OFDM, a new MCS table is introduced for URLLC, as given in Table 2 below. The new MCS table has a BLER target of $10^{-5}$. The normal MCS table has a BLER target of 10%.

TABLE 2

| MCS Index $I_{MCS}$ | Modulation Order $Q_m$ | Code rate R × 1024 | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | Reserved | |
| 30 | 4 | | |
| 31 | 6 | | |

For a PDSCH scheduling, the MCS information field in DCI is 5-bit. If the DCI CRC is scrambled with the new RNTI, the new MCS table is used with a target BLER of $10^{-5}$, the ACK feedback may be turned off; otherwise, the legacy MCS tables are used with a target BLER of 10%, and the ACK feedback is ON. For DL SPS, RRC indicates if the new 64QAM table is configured. The indication for the new MCS table for DL SPS is separate from the one for grant-based DL scheduling. Therefore, if the new MCS table is configured for a DL SPS transmission, the ACK feedback may be turned off; otherwise, the ACK feedback is on.

Namely, for example, in a case that the PDSCH transmission is corresponding to old MCS table (e.g., a first MCS table), the UE 102 may perform HARQ-ACK (i.e., either ACK or NACK) feedback. The gNB 160 may configure first PUCCH resources used for HARQ-ACK (i.e., either ACK or NACK) feedback. In a case that the PDSCH transmission is corresponding to new MCS table (e.g., a second MCS table), the UE 102 may perform only NACK feedback. The gNB 160 may configure second PUCCH resources used only for NACK feedback.

Also, for example, in a case that the PDSCH transmission is indicated by the DCI format with CRC scrambled by old RNTI (e.g., C-RNTI), the UE 102 may perform HARQ-ACK (i.e., either ACK or NACK) feedback. The gNB 160 may configure first PUCCH resources used for HARQ-ACK (i.e., either ACK or NACK) feedback. In a case that the PDSCH transmission is indicated by the DCI format with CRC scrambled by new RNTI (e.g., a first RNTI different from the C-RNTI), the UE 102 may perform only NACK feedback. The gNB 160 may configure second PUCCH resources used only for NACK feedback.

Here, the new RNTI (i.e., the DCI format with CRC scrambled by the new RNTI) may be used for identifying the new MCS table. Namely, the UE 102 may determine the MCS table (e.g., select one MCS table from more than one MCS table) based on the detected RNTI (e.g., the C-RNTI or the new RNTI). Also, the MCS table (i.e., the first MCS table and the second MCS table) may be used to determine the target MCS and/or code rate.

As described above, even in the case that ACK feedback is configured with "turned off", for eMBB PDSCH transmission, the UE 102 may perform HARQ-ACK (either ACK or NACK) feedback. Namely, the UE 102 may apply for the on/off of ACK feedback only for URLLC PDSCH transmission. The following descriptions are examples for the UE behavior in the case that ACK feedback is configured with "turned off".

For example, the eMBB PDSCH transmission and the URLLC PDSCH transmission may be identified by information included in the DCI format (e.g., the DCI format used for scheduling of the PDSCH). For example, similar with the description above, the eMBB PDSCH transmission and the URLLC PDSCH transmission may be identified by a value(s) set to the PDSCH-to-HARQ-timing indicator field (or 1-bit information).

Also, the eMBB PDSCH transmission and the URLLC PDSCH transmission may be identified by the DCI formats (e.g., the long DCI, the compact DCI). For example, the UE 102 may identify eMBB PDSCH transmission based on a detection of the long DCI format (i.e., the first DCI format). For example, based on the detection of the long DCI format, the UE 102 may perform HARQ-ACK (either ACK or NACK) feedback for eMBB PDSCH transmission. Also, the UE 102 may identify URLLC PDSCH transmission based on a detection of the compact DCI format (i.e., the second DCI format). For example, based on the detection of the compact DCI format, the UE 102 may perform only NACK feedback for a URLLC PDSCH transmission.

Also, the eMBB PDSCH transmission and the URLLC PDSCH transmission may be identified by the MCS table. For example, the UE 102 may identify eMBB PDSCH transmission based on the MCS table corresponding to the PDSCH transmission. For example, in a case that the PDSCH transmission is corresponding to the old MCS table (i.e., the first MCS table), the UE 102 may perform HARQ-ACK (either ACK or NACK) feedback for eMBB PDSCH transmission. Also, the UE 102 may identify URLLC PDSCH transmission based on the MCS table corresponding to the PDSCH transmission. For example, in a case that the PDSCH transmission is corresponding to the new MCS table (i.e., the second MCS table), the UE 102 may perform only NACK feedback for URLLC PDSCH transmission.

Also, the eMBB PDSCH transmission and the URLLC PDSCH transmission may be identified by RNTI used for scrambling of CRC to be attached to the DCI format. For example, the UE 102 may identify eMBB PDSCH transmission based on a detection of the DCI format with CRC scrambled by the old RNTI (e.g., the C-RNTI). For example, in a case that the PDSCH transmission is indicated by the DCI format with CRC scrambled by the old RNTI (e.g., the C-RNTI), the UE 102 may perform HARQ-ACK (either ACK or NACK) feedback for eMBB PDSCH transmission. Also, the UE 102 may identify URLLC PDSCH transmission based on a detection of the DCI format with CRC scrambled by the new RNTI (e.g., the first RNTI). For example, in a case that the PDSCH transmission is indicated by the DCI format with CRC scrambled by the new RNTI (e.g., the first RNTI), the UE 102 may perform only NACK feedback for URLLC PDSCH transmission.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations for channel collision handling with URLLC, and ACK feedback ON/OFF for HARQ-ACK of URLLC PDSCH transmissions as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

URLLC may coexist with other services (e.g., eMBB). Due to the latency requirement, URLLC may have a highest priority in some approaches. Some examples of URLLC coexistence with other services are given herein (e.g., in one or more of the following Figure descriptions).

FIG. 2 is an example illustrating sub-slot URLLC PDSCH and HARQ-ACK feedback within 1 subframe.

FIG. 3 illustrates ACK and NACK feedback differentiation methods. In a first method (Method 1), a HARQ-ACK PUCCH resource is configured, but NACK and ACK are transmitted with different parameters (e.g., number of PRBs, TxD, transmit power, etc.). In a second method (Method 2), different PUCCH resources are configured for NACK and ACK feedback with different parameters.

FIG. 4 illustrates an example of a collision of URLLC PUCCH for HARQ-ACK with other UL channels.

FIG. 5 illustrates an example where URLLC PUCCH for HARQ-ACK punctures all other channels in the overlapping symbols.

FIG. 6 illustrates an example of simultaneous URLLC PUCCH for HARQ-ACK and other UL channels.

Figure 7:
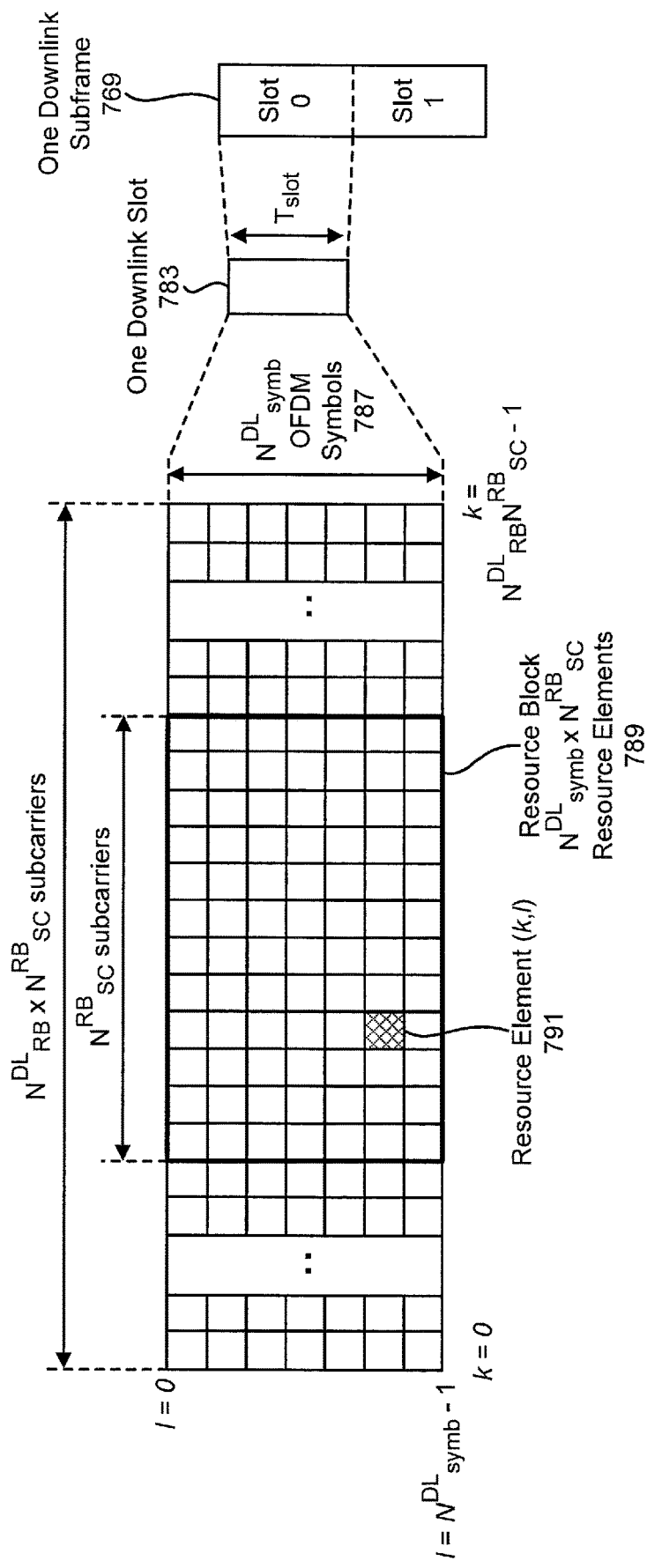
FIG. 7 is a diagram illustrating an example of a resource grid for the downlink.

FIG. 7 is a diagram illustrating one example of a resource grid for the downlink.

The resource grid illustrated in FIG. 7 may be utilized in some implementations of the systems and methods disclosed herein. More detail regarding the resource grid is given in connection with FIG. 1.

In FIG. 7, one downlink subframe 769 may include two downlink slots 783. $N^{DL}_{RB}$ is downlink bandwidth configuration of the serving cell, expressed in multiples of $N^{RB}_{sc}$, where $N^{RB}_{sc}$ is a resource block 789 size in the frequency domain expressed as a number of subcarriers, and $N^{DL}_{symb}$ is the number of OFDM symbols 787 in a downlink slot 783. A resource block 789 may include a number of resource elements (RE) 791.

For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 791 may be the RE 791 whose index l fulfils $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 8:
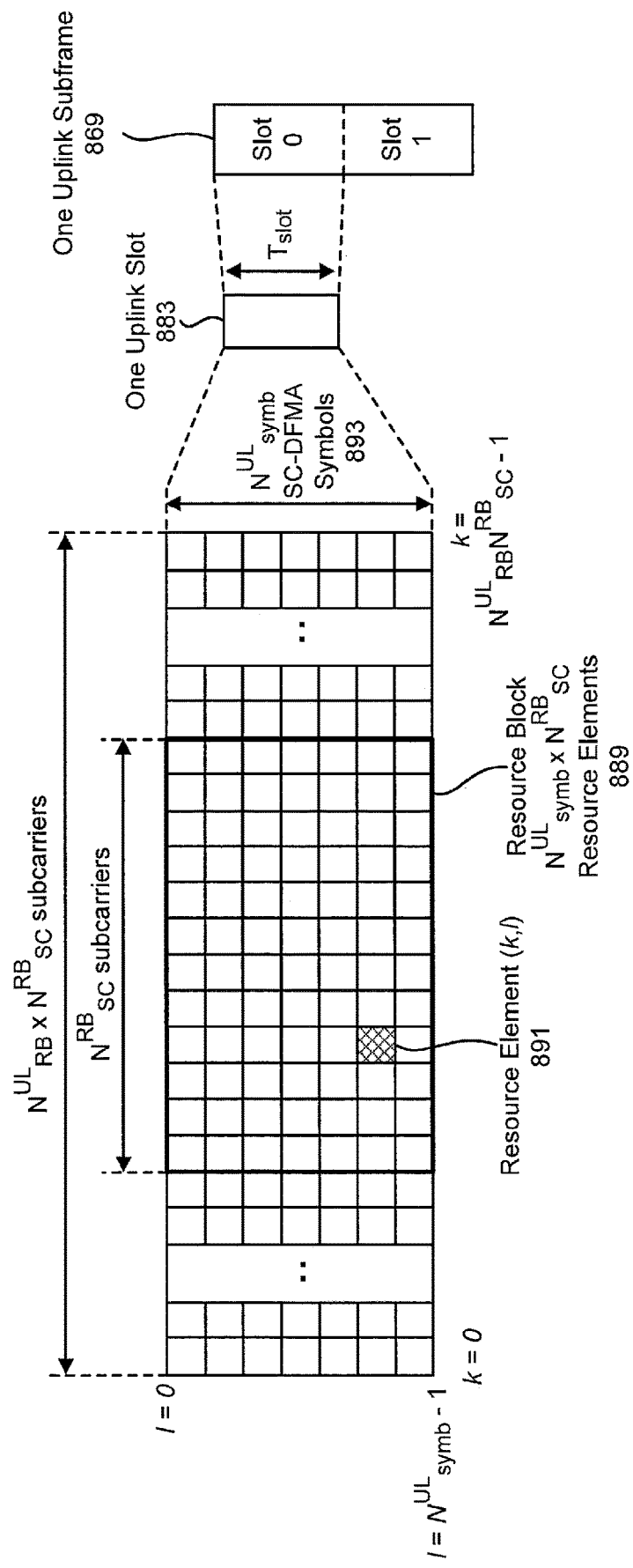
FIG. 8 is a diagram illustrating one example of a resource grid for the uplink.

FIG. 8 is a diagram illustrating one example of a resource grid for the uplink. The resource grid illustrated in FIG. 8 may be utilized in some implementations of the systems and methods disclosed herein. More detail regarding the resource grid is given in connection with FIG. 1.

In FIG. 8, one uplink subframe 869 may include two uplink slots 883. $N^{UL}_{RB}$ is uplink bandwidth configuration of the serving cell, expressed in multiples of $N^{RB}_{sc}$, where $N^{RB}_{sc}$ is a resource block 889 size in the frequency domain expressed as a number of subcarriers, and $N^{UL}_{symb}$ is the number of SC-FDMA symbols 893 in an uplink slot 883. A resource block 889 may include a number of resource elements (RE) 891.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 9:
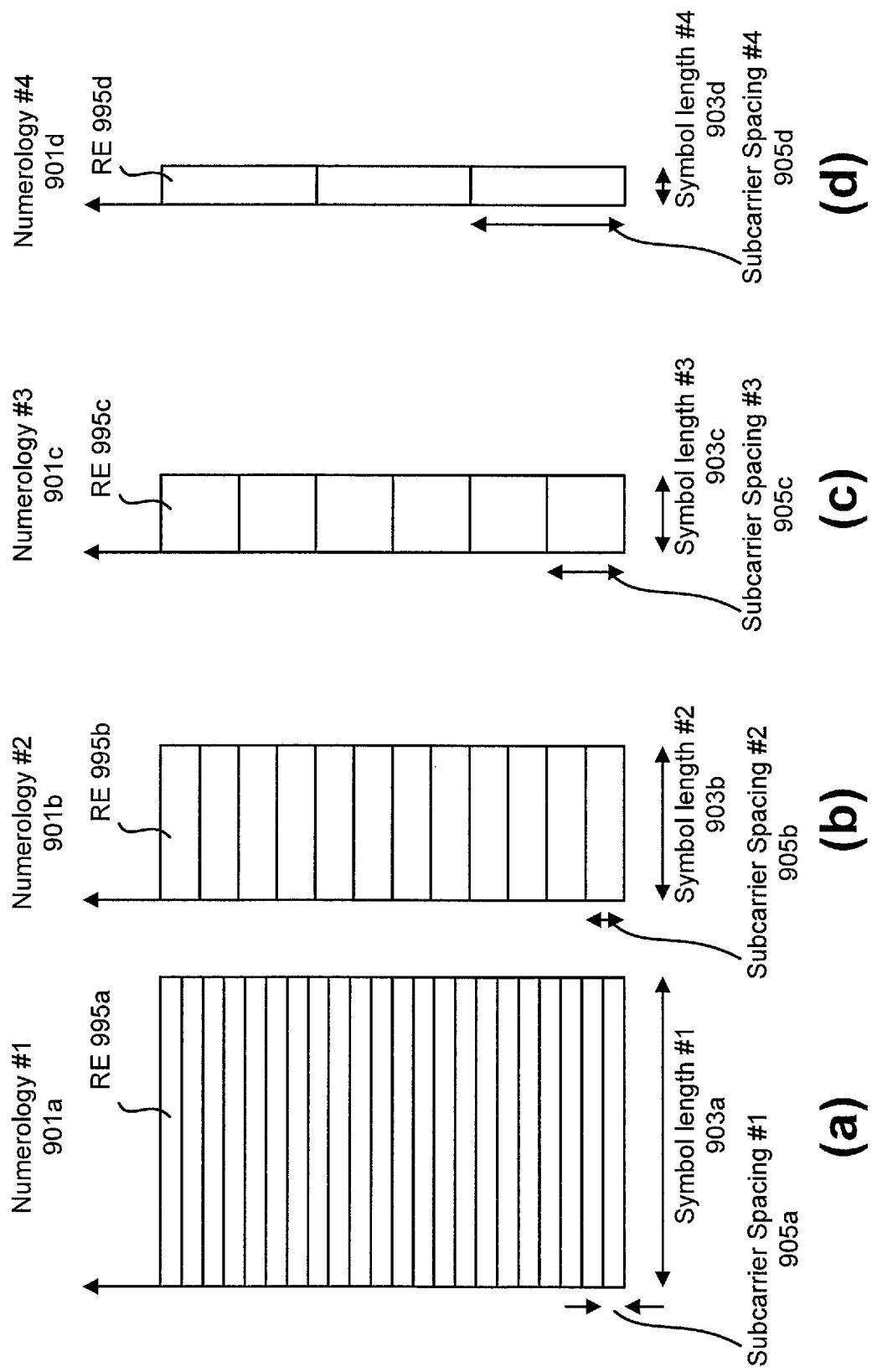
FIG. 9 shows examples of several numerologies.

FIG. 9 shows examples of several numerologies 901. The numerology #1 901a may be a basic numerology (e.g., a reference numerology). For example, a RE 995a of the basic numerology 901a may be defined with subcarrier spacing 905a of 15 kHz in frequency domain and 2048 Ts+CP length (e.g., 160 Ts or 144 Ts) in time domain (i.e., symbol length #1 903a), where Ts denotes a baseband sampling time unit defined as 1/(15000*2048) seconds. For the i-th numerology, the subcarrier spacing 905 may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology. FIG. 9 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 10:
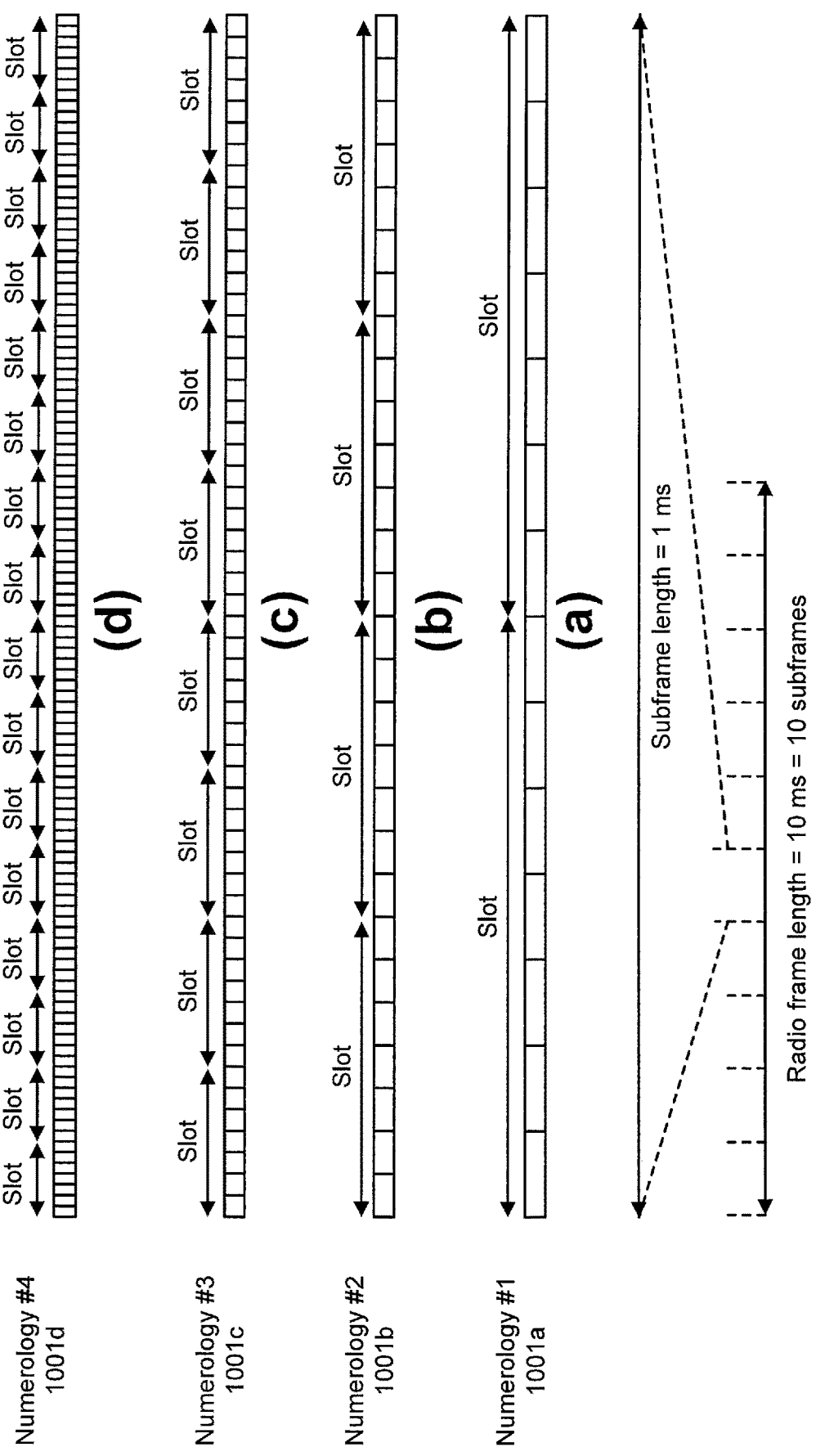
FIG. 10 shows examples of subframe structures for the numerologies that are shown in FIG. 9.

FIG. 10 shows examples of subframe structures for the numerologies 1001 that are shown in FIG. 9. Given that a slot 1083 includes $N^{DL}_{symb}$ (or $N^{UL}_{symb}$)=7 symbols, the slot length of the i+1-th numerology 1001 is a half of the one for the i-th numerology 1001, and eventually the number of slots 1083 in a subframe (i.e., 1 ms) becomes double. It may be noted that a radio frame may include 10 subframes, and the radio frame length may be equal to 10 ms.

Figure 11:
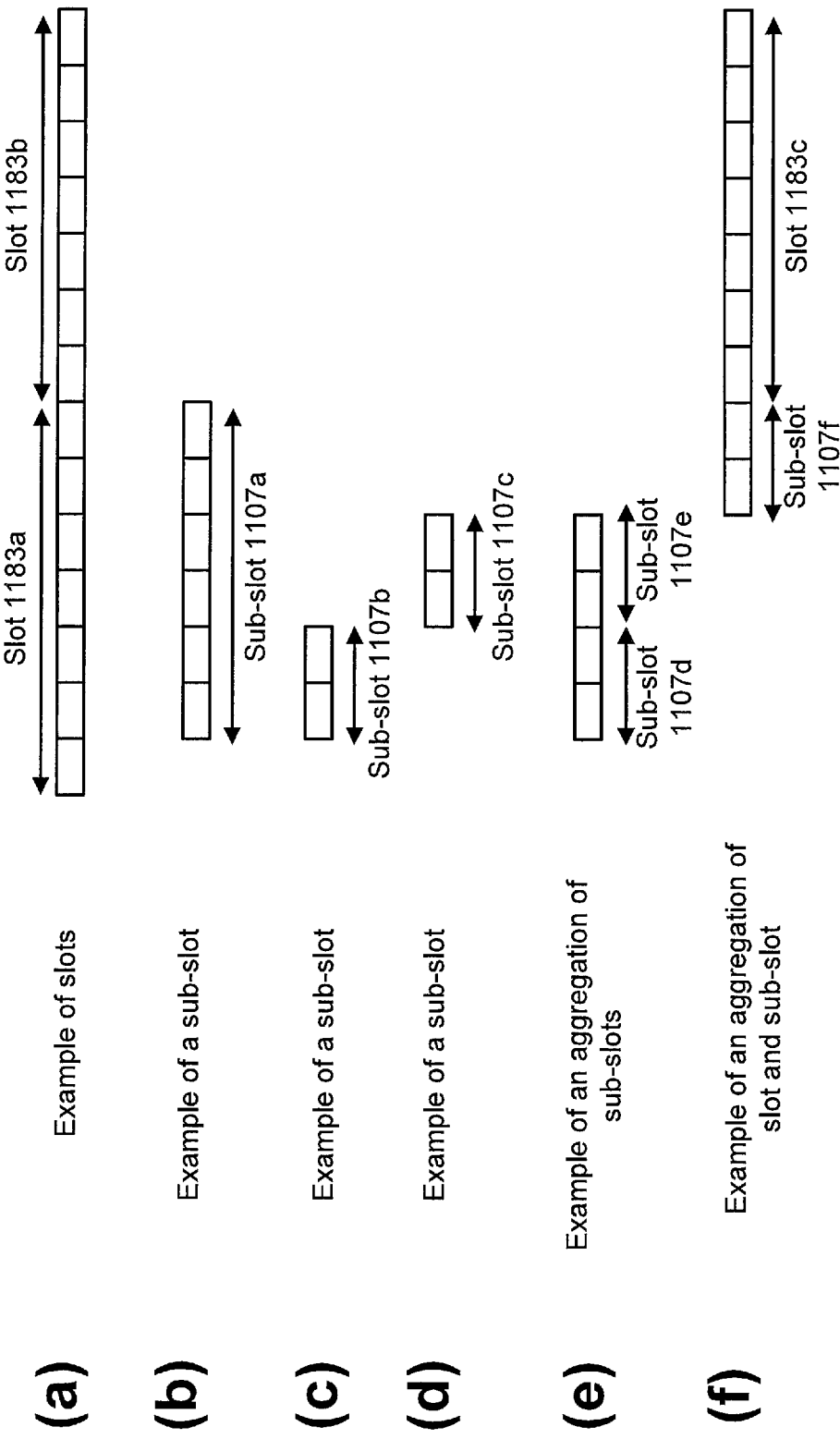
FIG. 11 shows examples of slots and sub-slots.

FIG. 11 shows examples of slots 1183 and sub-slots 1107. If a sub-slot 1107 is not configured by higher layer, the UE 102 and the eNB/gNB 160 may only use a slot 1183 as a scheduling unit. More specifically, a given transport block may be allocated to a slot 1183. If the sub-slot 1107 is configured by higher layer, the UE 102 and the eNB/gNB 160 may use the sub-slot 1107 as well as the slot 1183. The sub-slot 1107 may include one or more OFDM symbols. The maximum number of OFDM symbols that constitute the sub-slot 1107 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 1107 may start at any symbol within a slot 1183 unless it collides with a control channel. There could be restrictions of mini-slot length based on restrictions on starting position. For example, the sub-slot 1107 with the length of $N^{DL}_{symb}-1$ (or $N^{UL}_{symb}-1$) may start at the second symbol in a slot 1183. The starting position of a sub-slot 1107 may be indicated by a physical layer control channel (e.g., by DCI format). Alternatively, the starting position of a sub-slot 1107 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 1107.

In cases when the sub-slot 1107 is configured, a given transport block may be allocated to either a slot 1183, a sub-slot 1107, aggregated sub-slots 1107 or aggregated sub-slot(s) 1107 and slot 1183. This unit may also be a unit for HARQ-ACK bit generation.

Figure 12:
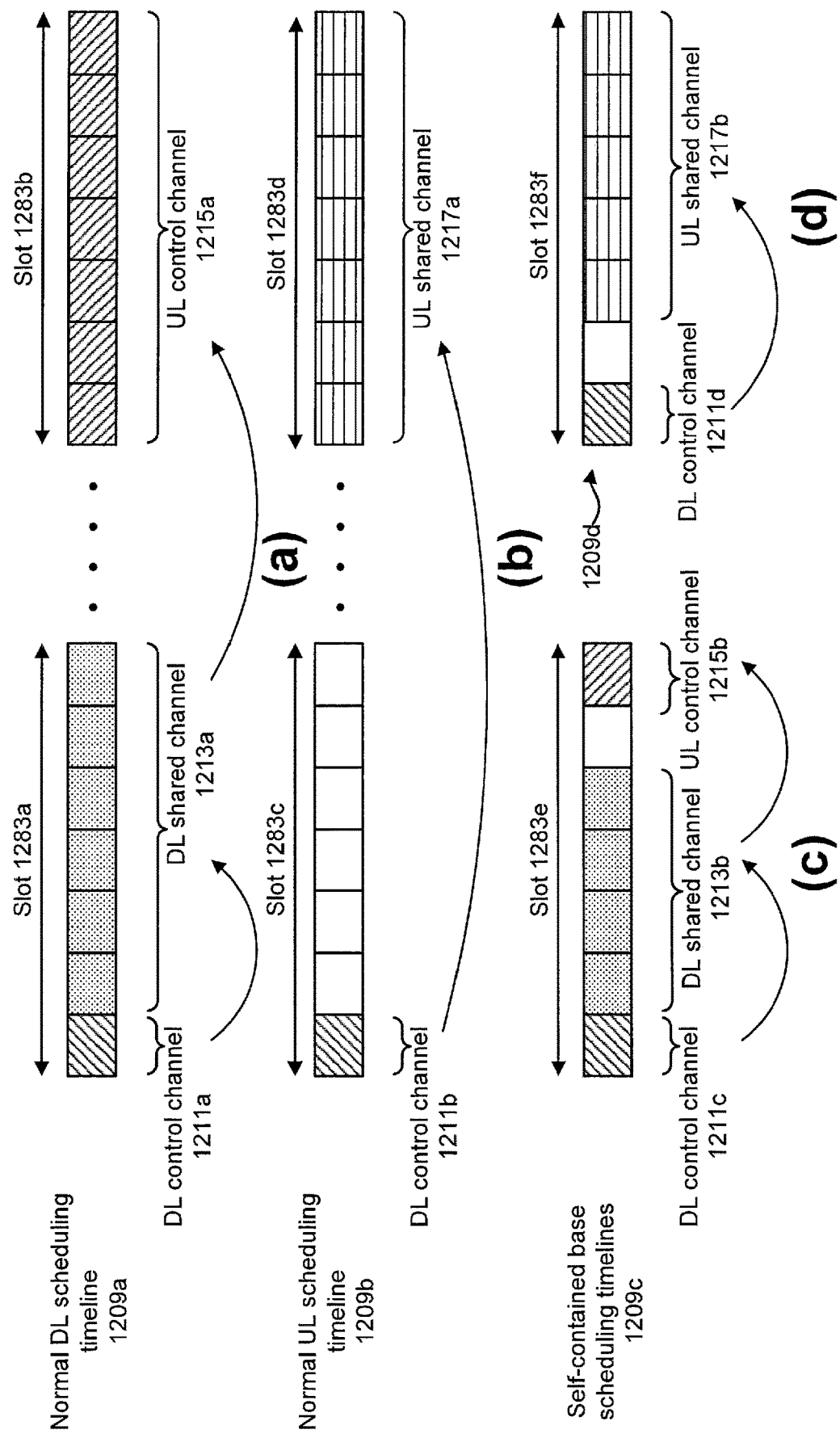
FIG. 12 shows examples of scheduling timelines.

FIG. 12 shows examples of scheduling timelines 1209. For a normal DL scheduling timeline 1209a, DL control channels are mapped the initial part of a slot 1283a. The DL control channels 1211 schedule DL shared channels 1213a in the same slot 1283a. HARQ-ACKs for the DL shared channels 1213a (i.e., HARQ-ACKs each of which indicates whether or not transport block in each DL shared channel 1213a is detected successfully) are reported via UL control channels 1215a in a later slot 1283b. In this instance, a given slot 1283 may contain either one of DL transmission and UL transmission.

For a normal UL scheduling timeline 1209b, DL control channels 1211b are mapped the initial part of a slot 1283c. The DL control channels 1211b schedule UL shared channels 1217a in a later slot 1283d. For these cases, the association timing (time shift) between the DL slot 1283c and the UL slot 1283d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 1209c, DL control channels 1211c are mapped to the initial part of a slot 1283e. The DL control channels 1211c schedule DL shared channels 1213b in the same slot 1283e. HARQ-ACKs for the DL shared channels 1213b are reported in UL control channels 1215b, which are mapped at the ending part of the slot 1283e.

For a self-contained base UL scheduling timeline 1209d, DL control channels 1211d are mapped to the initial part of a slot 1283f. The DL control channels 1211d schedule UL shared channels 1217b in the same slot 1283f. For these cases, the slot 1283f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 13:
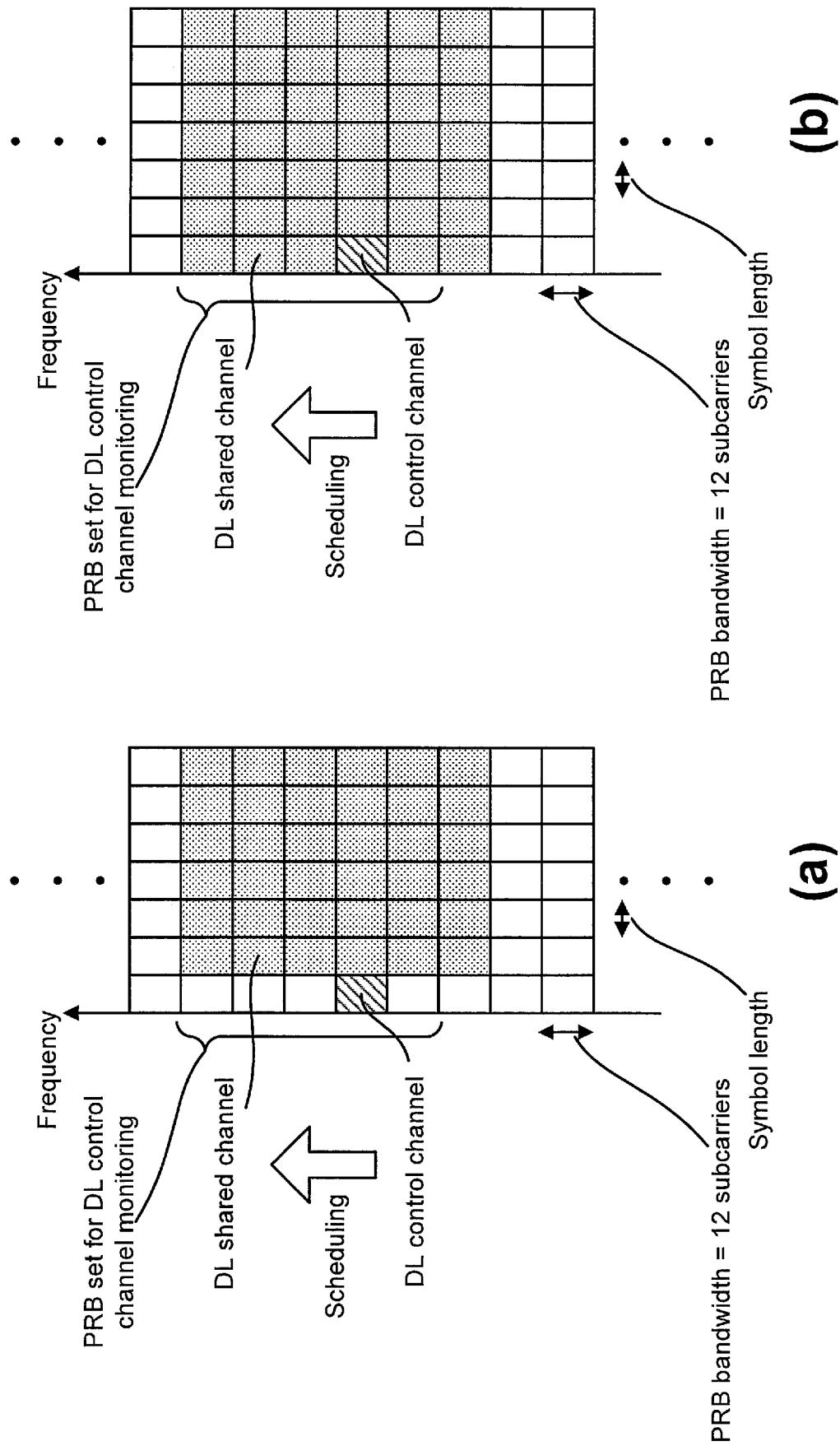
FIG. 13 shows examples of DL control channel monitoring regions.

FIG. 13 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include Demodulation reference signals (DM-RS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 14:
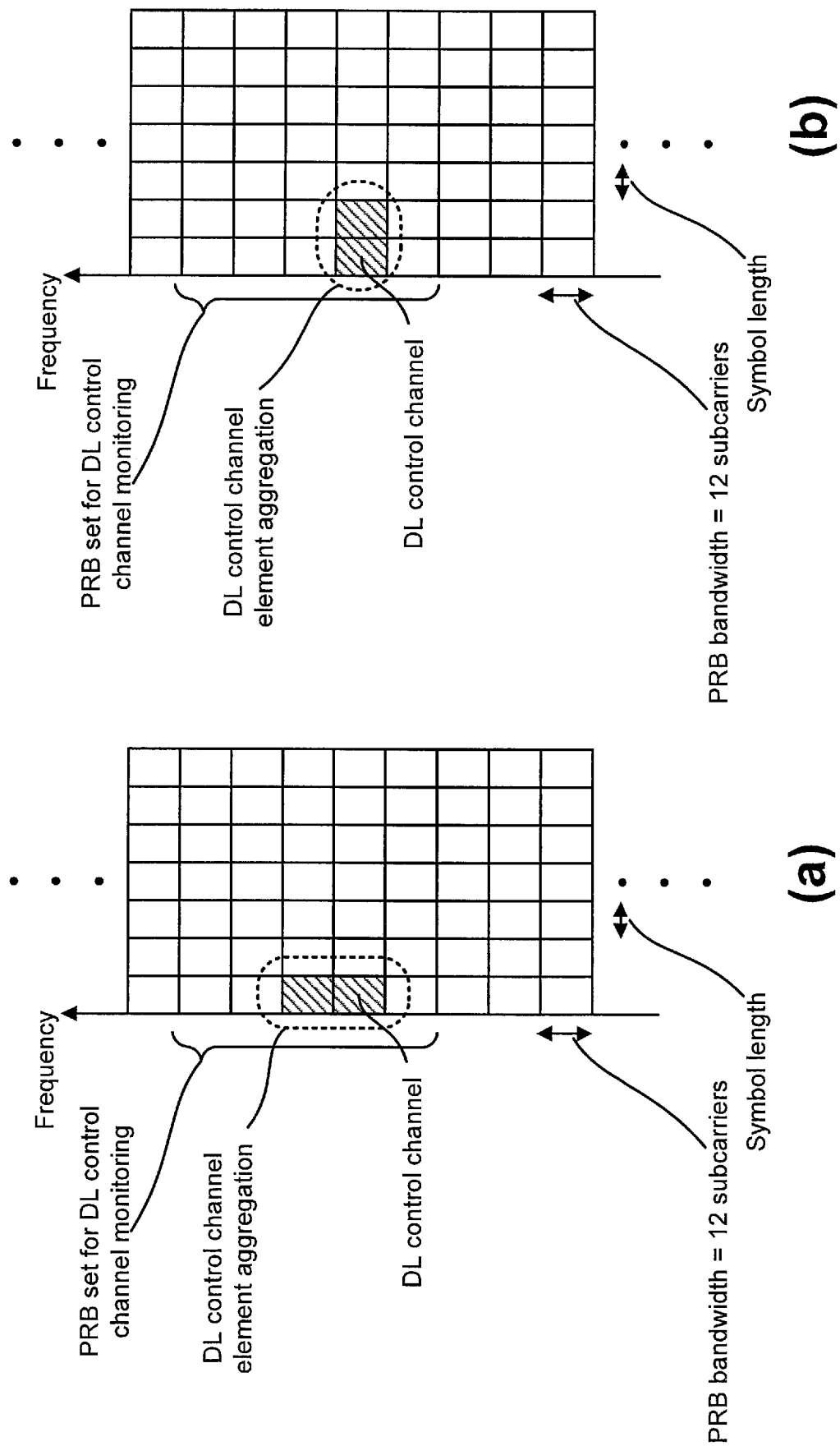
FIG. 14 shows examples of DL control channel which includes more than one control channel elements.

FIG. 14 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 15:
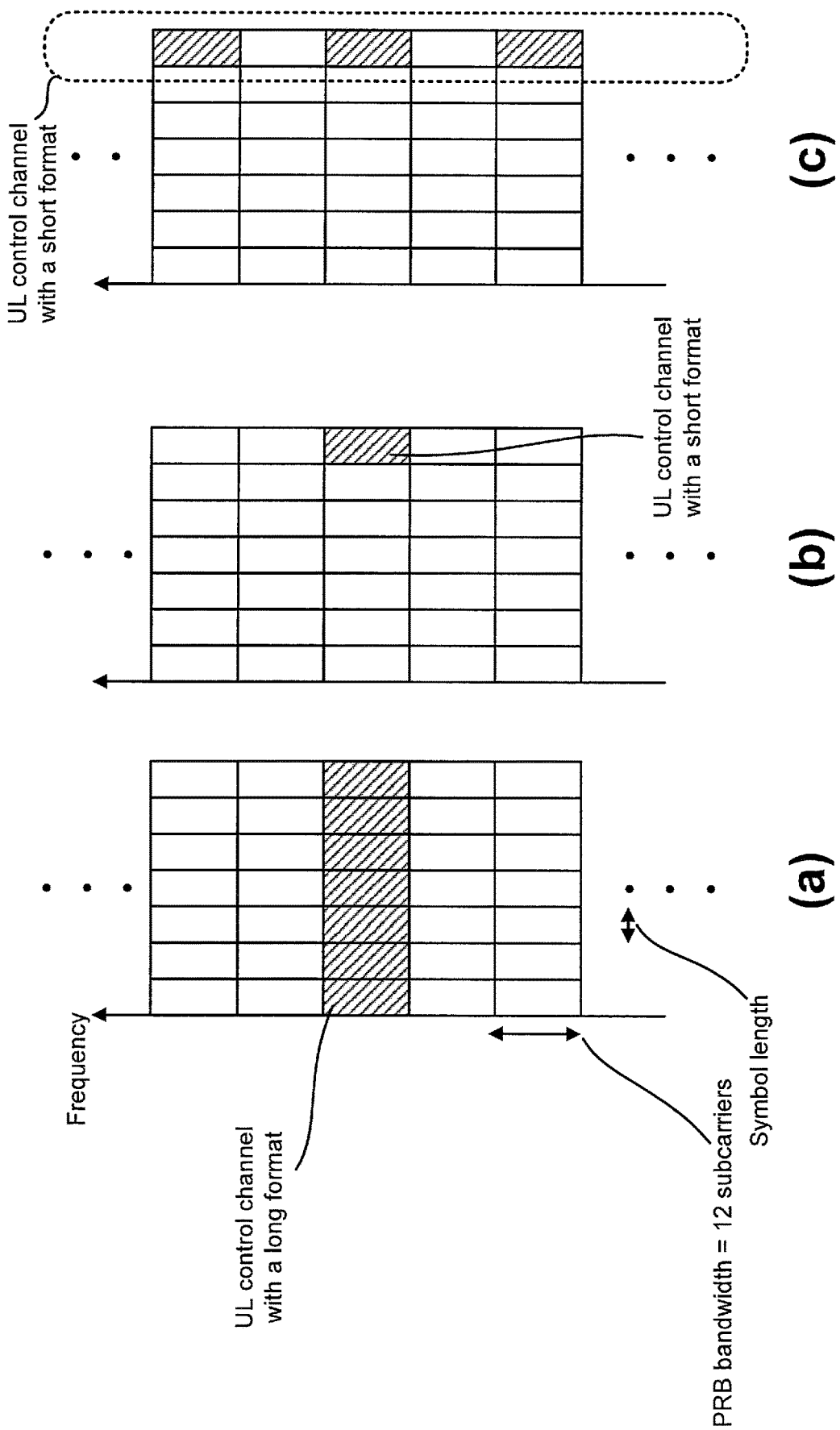
FIG. 15 shows examples of UL control channel structures.

FIG. 15 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRB s. For example, interlaced mapping may be applied, namely the UL control channel may be mapped to every N PRBs (e.g. 5 or 10) within a system bandwidth.

Figure 16:
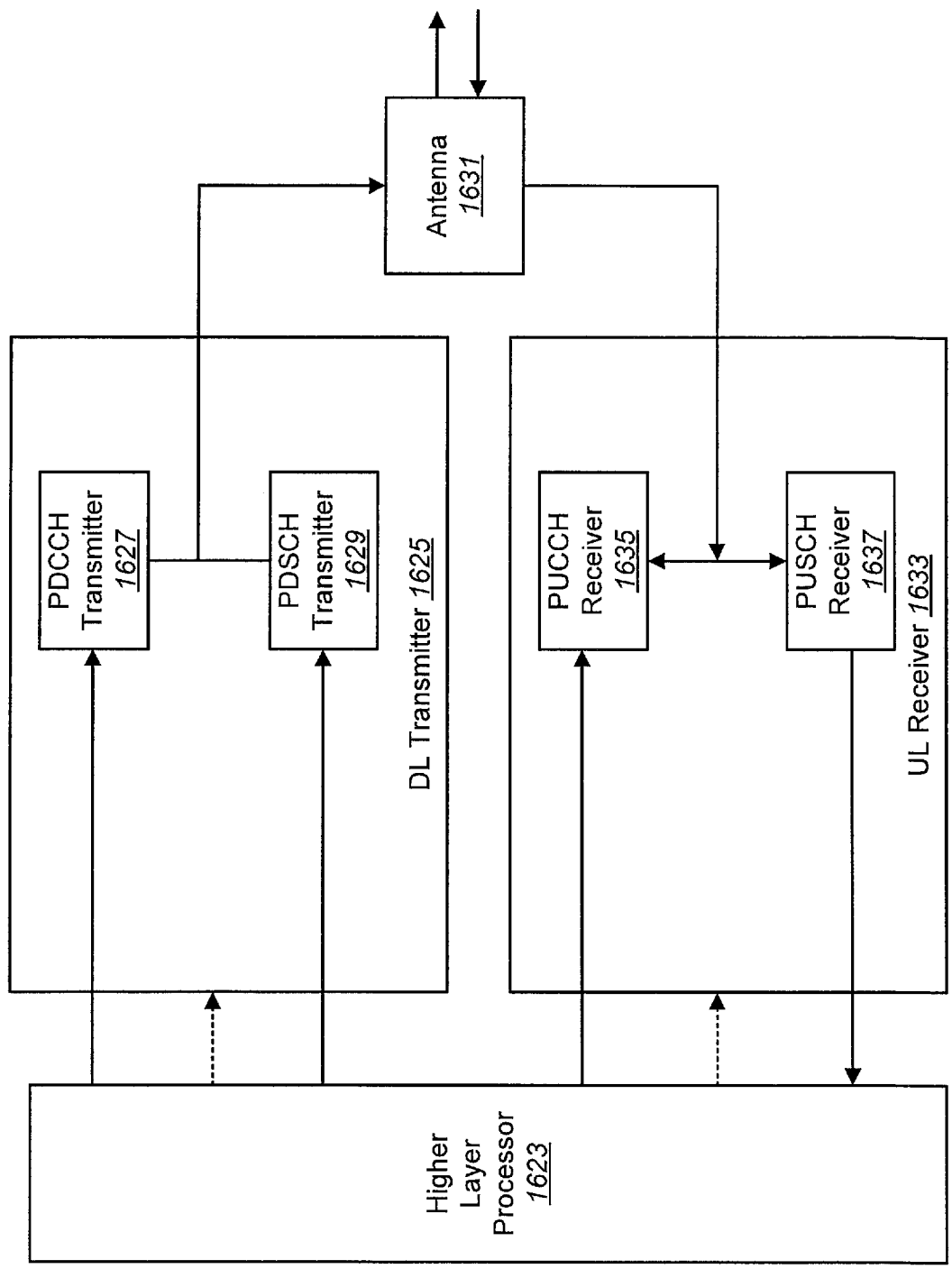
FIG. 16 is a block diagram illustrating one implementation of a gNB.

FIG. 16 is a block diagram illustrating one implementation of a gNB 1660. The gNB 1660 may include a higher layer processor 1623, a DL transmitter 1625, a UL receiver 1633, and one or more antenna 1631. The DL transmitter 1625 may include a PDCCH transmitter 1627 and a PDSCH transmitter 1629. The UL receiver 1633 may include a PUCCH receiver 1635 and a PUSCH receiver 1637.

The higher layer processor 1623 may manage physical layer's behaviors (the DL transmitter's and the UL receiver's behaviors) and provide higher layer parameters to the physical layer. The higher layer processor 1623 may obtain transport blocks from the physical layer. The higher layer processor 1623 may send/acquire higher layer messages such as an RRC message and MAC message to/from a UE's higher layer. The higher layer processor 1623 may provide the PDSCH transmitter transport blocks and provide the PDCCH transmitter transmission parameters related to the transport blocks.

The DL transmitter 1625 may multiplex downlink physical channels and downlink physical signals (including reservation signal) and transmit them via transmission antennas 1631. The UL receiver 1633 may receive multiplexed uplink physical channels and uplink physical signals via receiving antennas 1631 and de-multiplex them. The PUCCH receiver 1635 may provide the higher layer processor 1623 UCI. The PUSCH receiver 1637 may provide the higher layer processor 1623 received transport blocks.

Figure 17:
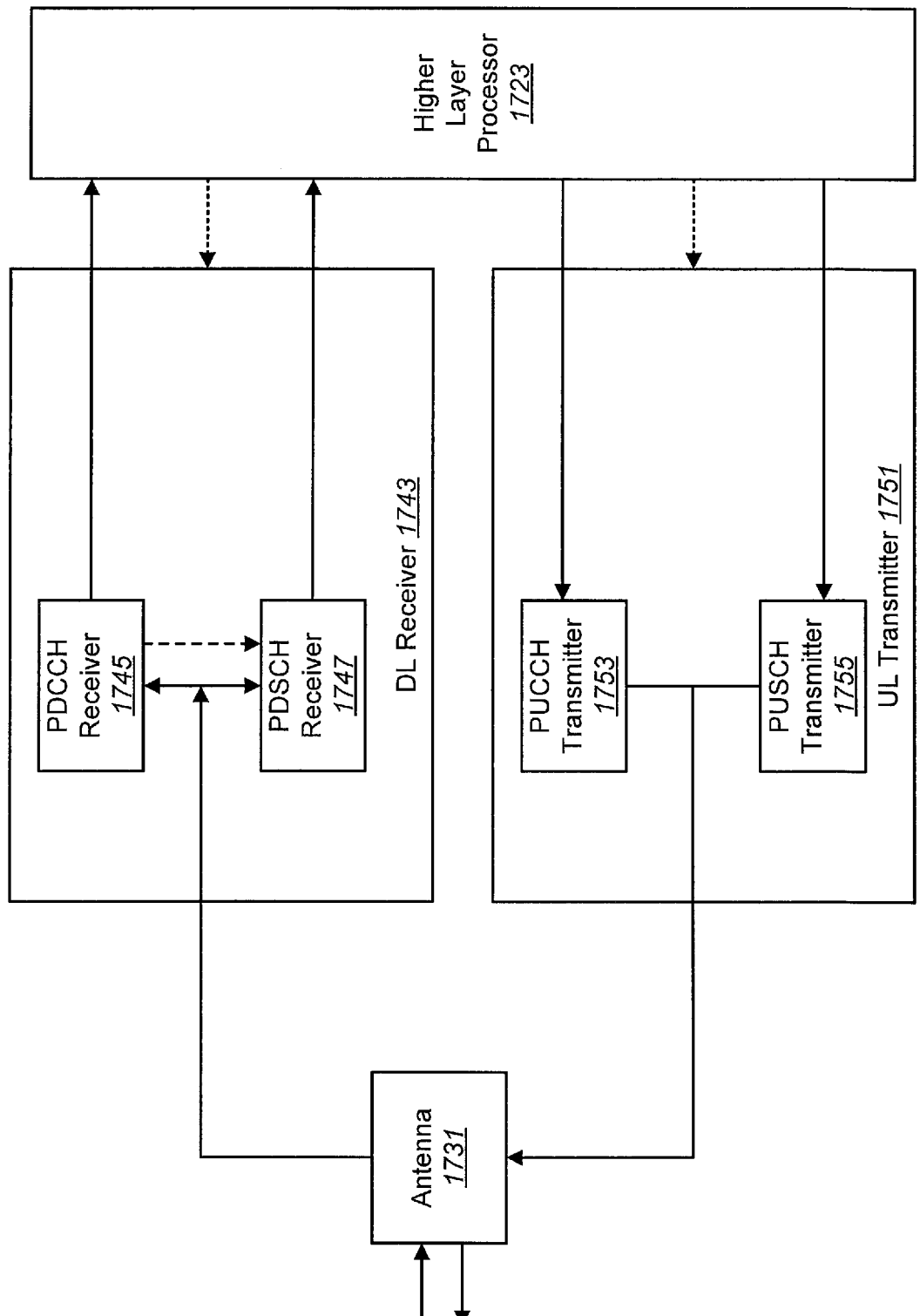
FIG. 17 is a block diagram illustrating one implementation of a UE.

FIG. 17 is a block diagram illustrating one implementation of a UE 1702. The UE 1702 may include a higher layer processor 1723, a UL transmitter 1751, a DL receiver 1743, and one or more antenna 1731. The UL transmitter 1751 may include a PUCCH transmitter 1753 and a PUSCH transmitter 1755. The DL receiver 1743 may include a PDCCH receiver 1745 and a PDSCH receiver 1747.

The higher layer processor 1723 may manage physical layer's behaviors (the UL transmitter's and the DL receiver's behaviors) and provide higher layer parameters to the physical layer. The higher layer processor 1723 may obtain transport blocks from the physical layer. The higher layer processor 1723 may send/acquire higher layer messages such as an RRC message and MAC message to/from a UE's higher layer. The higher layer processor 1723 may provide the PUSCH transmitter transport blocks and provide the PUCCH transmitter 1753 UCI.

The DL receiver 1743 may receive multiplexed downlink physical channels and downlink physical signals via receiving antennas 1731 and de-multiplex them. The PDCCH receiver 1745 may provide the higher layer processor 1723 DCI. The PDSCH receiver 1747 may provide the higher layer processor 1723 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 18:
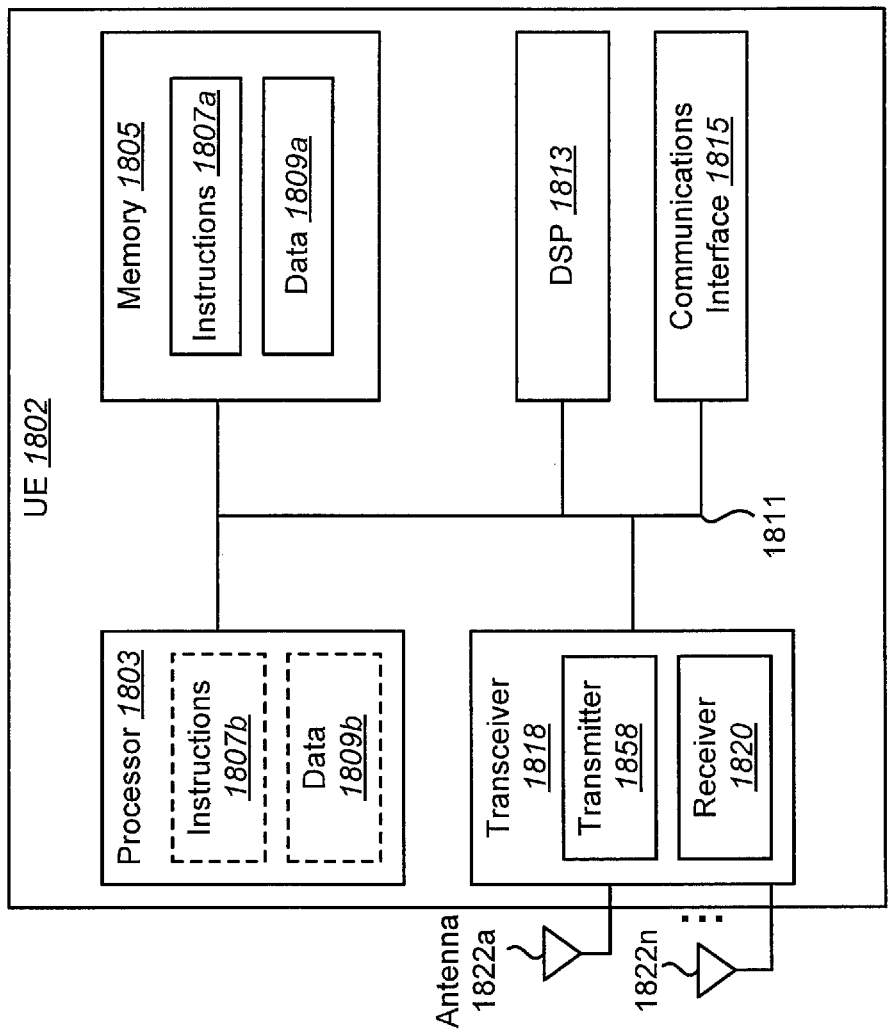
FIG. 18 illustrates various components that may be utilized in a UE.

FIG. 18 illustrates various components that may be utilized in a UE 1802. The UE 1802 described in connection with FIG. 18 may be implemented in accordance with the UE 102 described in connection with FIG. 1. The UE 1802 includes a processor 1803 that controls operation of the UE 1802. The processor 1803 may also be referred to as a central processing unit (CPU). Memory 1805, which may include read-only memory (ROM), random access memory (RAM), a combination of the two or any type of device that may store information, provides instructions 1807a and data 1809a to the processor 1803. A portion of the memory 1805 may also include non-volatile random-access memory (NVRAM). Instructions 1807b and data 1809b may also reside in the processor 1803. Instructions 1807b and/or data 1809b loaded into the processor 1803 may also include instructions 1807a and/or data 1809a from memory 1805 that were loaded for execution or processing by the processor 1803. The instructions 1807b may be executed by the processor 1803 to implement the methods described above.

The UE 1802 may also include a housing that contains one or more transmitters 1858 and one or more receivers 1820 to allow transmission and reception of data. The transmitter(s) 1858 and receiver(s) 1820 may be combined into one or more transceivers 1818. One or more antennas 1822a-n are attached to the housing and electrically coupled to the transceiver 1818.

The various components of the UE 1802 are coupled together by a bus system 1811, which may include a power bus, a control signal bus and a status signal bus, in addition to a data bus. However, for the sake of clarity, the various buses are illustrated in FIG. 18 as the bus system 1811. The UE 1802 may also include a digital signal processor (DSP) 1813 for use in processing signals. The UE 1802 may also include a communications interface 1815 that provides user access to the functions of the UE 1802. The UE 1802 illustrated in FIG. 18 is a functional block diagram rather than a listing of specific components.

Figure 19:
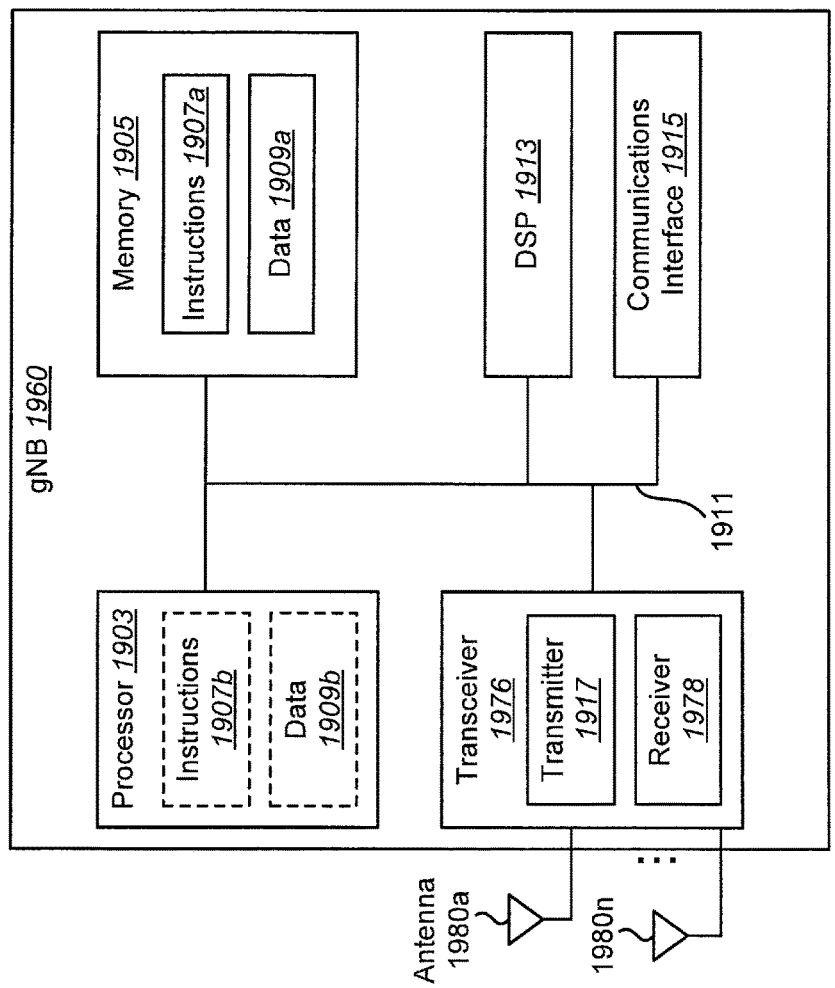
FIG. 19 illustrates various components that may be utilized in a gNB.

FIG. 19 illustrates various components that may be utilized in a gNB 1960. The gNB 1960 described in connection with FIG. 19 may be implemented in accordance with the gNB 160 described in connection with FIG. 1. The gNB 1960 includes a processor 1903 that controls operation of the gNB 1960. The processor 1903 may also be referred to as a central processing unit (CPU). Memory 1905, which may include read-only memory (ROM), random access memory (RAM), a combination of the two or any type of device that may store information, provides instructions 1907a and data 1909a to the processor 1903. A portion of the memory 1905 may also include non-volatile random-access memory (NVRAM). Instructions 1907b and data 1909b may also reside in the processor 1903. Instructions 1907b and/or data 1909b loaded into the processor 1903 may also include instructions 1907a and/or data 1909a from memory 1905 that were loaded for execution or processing by the processor 1903. The instructions 1907b may be executed by the processor 1903 to implement the methods described above.

The gNB 1960 may also include a housing that contains one or more transmitters 1917 and one or more receivers 1978 to allow transmission and reception of data. The transmitter(s) 1917 and receiver(s) 1978 may be combined into one or more transceivers 1976. One or more antennas 1980a-n are attached to the housing and electrically coupled to the transceiver 1976.

The various components of the gNB 1960 are coupled together by a bus system 1911, which may include a power bus, a control signal bus and a status signal bus, in addition to a data bus. However, for the sake of clarity, the various buses are illustrated in FIG. 19 as the bus system 1911. The gNB 1960 may also include a digital signal processor (DSP) 1913 for use in processing signals. The gNB 1960 may also include a communications interface 1915 that provides user access to the functions of the gNB 1960. The gNB 1960 illustrated in FIG. 19 is a functional block diagram rather than a listing of specific components.

Figure 20:
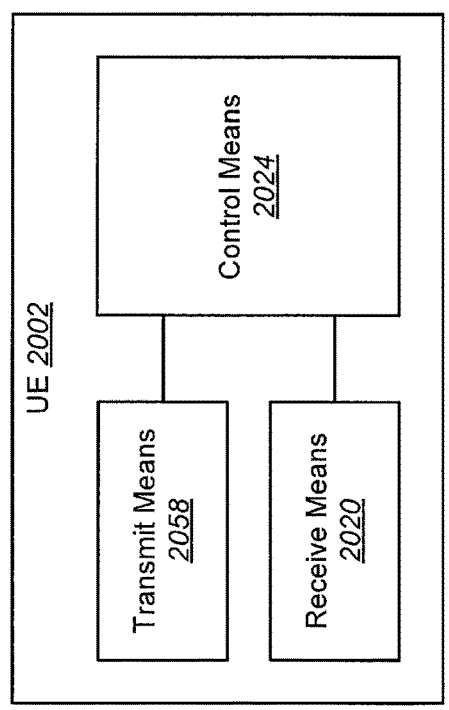
FIG. 20 is a block diagram illustrating one implementation of a UE in which channel collision handling with URLLC, and ACK feedback ON/OFF for HARQ-ACK of URLLC PDSCH transmissions may be implemented.

FIG. 20 is a block diagram illustrating one implementation of a UE 2002 in which channel collision handling with URLLC, and ACK feedback ON/OFF for HARQ-ACK of URLLC PDSCH transmissions may be implemented. The UE 2002 includes transmit means 2058, receive means 2020 and control means 2024. The transmit means 2058, receive means 2020 and control means 2024 may be configured to perform one or more of the functions described in connection with FIG. 1 above. FIG. 18 above illustrates one example of a concrete apparatus structure of FIG. 20. Other various structures may be implemented to realize one or more of the functions of FIG. 1. For example, a DSP may be realized by software.

Figure 21:
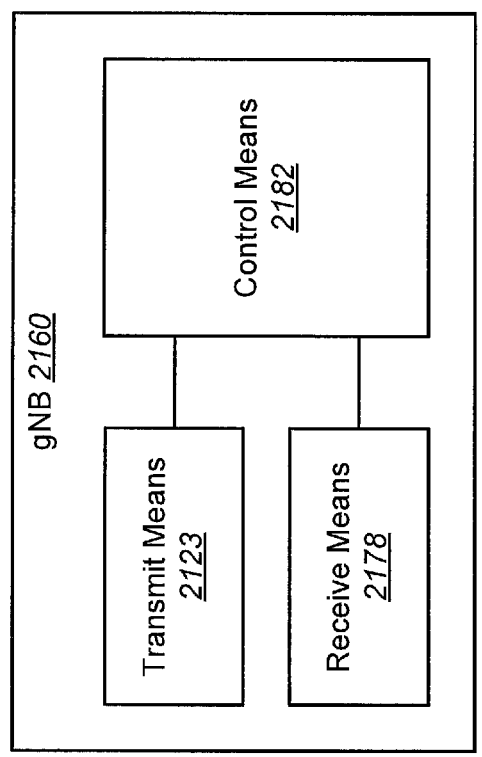
FIG. 21 is a block diagram illustrating one implementation of a gNB in which channel collision handling with URLLC, and ACK feedback ON/OFF for HARQ-ACK of URLLC PDSCH transmissions may be implemented.

FIG. 21 is a block diagram illustrating one implementation of a gNB 2160 in which channel collision handling with URLLC, and ACK feedback ON/OFF for HARQ-ACK of URLLC PDSCH transmissions may be implemented. The gNB 2160 includes transmit means 2123, receive means 2178 and control means 2182. The transmit means 2123, receive means 2178 and control means 2182 may be configured to perform one or more of the functions described in connection with FIG. 1 above. FIG. 19 above illustrates one example of a concrete apparatus structure of FIG. 21. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

CROSS REFERENCE

This Nonprovisional application claims priority under 35 U.S.C. § 119 on provisional Application No. 62/716,836 on Aug. 9, 2018, the entire contents of which are hereby incorporated by reference.

What is claimed is:
1. A user equipment (UE), comprising:
a processor configured to:
configure physical uplink control channel (PUCCH) repetitions with a higher priority for a Hybrid Automatic Repeat Request Acknowledgement (HARQ-ACK) feedback, the HARQ-ACK feedback being a feedback for a physical downlink shared channel (PDSCH), and
determine if there is a collision between the PUCCH repetitions with the higher priority for the HARQ-ACK feedback and more than one physical uplink channel, including a physical uplink shared channel

(PUSCH), with a lower priority that starts earlier than the PUCCH repetitions with the higher priority; and transmitting circuitry configured to transmit the HARQ-ACK feedback on the PUCCH repetitions with the higher priority, transmit the more than one physical uplink channel with the lower priority in non-overlapping symbols, and drop the more than one physical uplink channel with the lower priority in overlapping symbols, in a case that the collision occurs, wherein the overlapping symbols are located over a plurality of slots, and in each of the plurality of slots, a corresponding one of the PUCCH repetitions with the higher priority for the HARQ-ACK feedback is transmitted.

2. A base station device, comprising:

transmitting circuitry configured to transmit a physical downlink shared channel (PDSCH); and receiving circuitry configured to receive, from a user equipment (UE), physical uplink control channel (PUCCH) repetitions with a higher priority for a Hybrid Automatic Repeat Request Acknowledgement (HARQ-ACK) feedback, the HARQ-ACK feedback being a feedback for the PDSCH, wherein in a case that there is a collision between the PUCCH repetitions with the higher priority for the HARQ-ACK feedback and more than one physical uplink channel, including a physical uplink shared channel (PUSCH), with a lower priority that starts earlier than the PUCCH repetitions with the higher priority, the receiving circuitry is configured to, in addition to receiving the PUCCH repetitions with the higher priority, receive, from the UE, the more than one physical uplink channel with the lower priority in non-overlapping symbols without receiving the more than one physical uplink channel with the lower priority in overlapping symbols, wherein the overlapping symbols are located over a plurality of slots, and in each of the plurality of slots, a corresponding one of the PUCCH repetitions with the higher priority for the HARQ-ACK feedback is received.

3. A method performed by a user equipment (UE), comprising:

configuring physical uplink control channel (PUCCH) repetitions with a higher priority for a Hybrid Automatic Repeat Request Acknowledgement (HARQ-ACK) feedback, the HARQ-ACK feedback being a feedback for a physical downlink shared channel (PDSCH);

determining if there is a collision between the PUCCH repetitions with the higher priority for the HARQ-ACK feedback and more than one physical uplink channel, including a physical uplink shared channel (PUSCH), with a lower priority that starts earlier than the PUCCH repetitions with the higher priority, wherein in a case that the collision occurs, the method further comprises:

transmitting the HARQ-ACK feedback on the PUCCH repetitions with the higher priority;

transmitting the more than one physical uplink channel with the lower priority in non-overlapping symbols; and dropping the more than one physical uplink channel with the lower priority in overlapping symbols, wherein the overlapping symbols being located over a plurality of slots, and in each of the plurality of slots, a corresponding one of the PUCCH repetitions with the higher priority for the HARQ-ACK feedback is transmitted.

4. A method performed by a base station device, comprising:

transmitting a physical downlink shared channel (PDSCH); and receiving, from a user equipment (UE), physical uplink control channel (PUCCH) repetitions with a higher priority for a Hybrid Automatic Repeat Request Acknowledgement (HARQ-ACK) feedback, the HARQ-ACK feedback being a feedback for the PDSCH, wherein in a case that there is a collision between the PUCCH repetitions with the higher priority for the HARQ-ACK feedback and more than one physical uplink channel, including a physical uplink shared channel (PUSCH), with a lower priority that starts earlier than the PUCCH repetitions with the higher priority, the method further comprises:

in addition to receiving the PUCCH repetitions with the higher priority, receiving, from the UE, the more than one physical uplink channel with the lower priority in non-overlapping symbols without receiving the more than one physical uplink channel with the lower priority in overlapping symbols, wherein the overlapping symbols are located over a plurality of slots, and in each of the plurality of slots, a corresponding one of the PUCCH repetitions with the higher priority for the HARQ-ACK feedback is received.

* * * * *